US008500217B2

(12) United States Patent
Isono

(10) Patent No.: US 8,500,217 B2
(45) Date of Patent: Aug. 6, 2013

(54) VEHICLE BRAKING APPARTATUS

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 282 days.

(21) Appl. No.: 12/810,413

(22) PCT Filed: Jun. 19, 2009

(86) PCT No.: PCT/JP2009/002805
§ 371 (c)(1),
(2), (4) Date: Jun. 24, 2010

(87) PCT Pub. No.: WO2009/154004
PCT Pub. Date: Dec. 23, 2009

(65) Prior Publication Data
US 2010/0283315 A1    Nov. 11, 2010

(30) Foreign Application Priority Data

Jun. 20, 2008  (JP) ................................ 2008-161832

(51) Int. Cl.
*B60T 8/42*    (2006.01)
(52) U.S. Cl.
USPC .................. 303/115.4; 303/119.2; 303/113.4; 303/115.2
(58) Field of Classification Search
USPC .......................................... 303/115.4, 119.2
See application file for complete search history.

(56) References Cited

U.S. PATENT DOCUMENTS

| | | | | |
|---|---|---|---|---|
| 5,123,717 A * | 6/1992 | Willmann | .................. | 303/113.4 |
| 7,244,002 B2 * | 7/2007 | Tsunehara | ................. | 303/116.2 |
| 7,309,112 B2 * | 12/2007 | Isono | .............................. | 303/11 |
| 7,498,689 B2 | 3/2009 | Mitani et al. | | |
| 7,651,176 B2 * | 1/2010 | Inoue et al. | ................ | 303/114.1 |
| 8,052,227 B2 * | 11/2011 | Isono | ........................... | 303/119.2 |
| 2010/0171363 A1 * | 7/2010 | Isono | ............................. | 303/13 |

FOREIGN PATENT DOCUMENTS

| | | | |
|---|---|---|---|
| JP | 2005 14754 | | 1/2005 |
| JP | 2008 49898 | | 3/2008 |
| JP | 2008132966 A | * | 6/2008 |
| JP | 2008 298016 | | 12/2008 |
| RU | 2 251 501 C1 | | 5/2005 |
| SU | 1 726 299 A1 | | 4/1992 |

OTHER PUBLICATIONS

Decision of a Patent Grant issued Jan. 31, 2012, in Russian Patent Application No. 2010133143/11 (with English-language translation).

* cited by examiner

*Primary Examiner* — Thomas Irvin
(74) *Attorney, Agent, or Firm* — Oblon, Spivak, McClelland, Maier & Neustadt, L.L.P.

(57) ABSTRACT

In a vehicle braking apparatus, a pressure control valve is controlled according to a brake operation amount of a brake pedal to thereby regulate hydraulic pressure and supply it to wheel cylinders. By controlling the pressure control valve by using hydraulic pressure output from a master cylinder as pilot pressure, the hydraulic pressure can be regulated and supplied to the wheel cylinders. A master cut valve capable of opening and closing a first hydraulic pipe that supplies the hydraulic pressure from the master cylinder to the wheel cylinders is provided. An external pressure supply pipe that supplies the pilot pressure to the pressure control valve is connected to the first hydraulic pipe on a side of the master cut valve closer to the wheel cylinders.

6 Claims, 5 Drawing Sheets

FIG.5

VEHICLE BRAKING APPARATUS

TECHNICAL FIELD

The present invention relates to a vehicle braking apparatus that electronically controls a braking force applied to the vehicle in response to a brake operation by an occupant.

BACKGROUND ART

As a vehicle braking apparatus, there is a known electronically controlled braking apparatus for electrically controlling a braking force of the vehicle, i.e., hydraulic pressure supplied to wheel cylinders for which braking forces are to be generated in response to a brake operating force or a brake operation amount input from a brake pedal. As this electronically controlled braking apparatus, there is a known ECB (Electronically Controlled Brake) that controls the braking forces by setting target braking hydraulic pressure according to the brake operation amount, regulating the hydraulic pressure accumulated in an accumulator, and then supplying the hydraulic pressure to the wheel cylinders.

The ECB includes a master cylinder actuated in response to brake pedal operation by a driver, a stroke simulator coupled to the master cylinder, a master cut valve provided in a hydraulic path for connecting the master cylinder and the brake wheel cylinders, the accumulator capable of accumulating the hydraulic pressure, and a pressure regulating mechanism for regulating the hydraulic pressure accumulated in the accumulator. Therefore, if the driver depresses the brake pedal, the master cylinder generates the hydraulic pressure according to the operation amount and part of hydraulic oil flows into a stroke simulator to absorb a brake pedal stroke and apply a brake reaction force to the brake pedal to thereby regulate the operation amount of the brake pedal. On the other hand, a brake ECU sets a target braking force, i.e., target braking hydraulic pressure for the vehicle according to the brake operation amount and the pressure regulating mechanism regulates the hydraulic pressure of the accumulator and supplies it to the respective wheel cylinders and, as a result, it is possible to obtain the braking force desired by the occupant.

In the ECB described above, appropriate braking hydraulic pressure is supplied to the respective wheel cylinders by setting appropriate target braking hydraulic pressure according to the brake operation input from the brake pedal and electrically controlling the pressure regulating mechanism to regulate the pressure. Therefore, when a power supply unit fails, the pressure regulating mechanism cannot be controlled and it becomes difficult to supply the appropriate hydraulic pressure to the respective wheel cylinders. Therefore, as a unit for normally actuating the electronically controlled apparatus such as the braking apparatus even when the power supply unit fails, there is a power supply unit for a vehicle described in Patent Document 1, for example.

The power supply unit for the vehicle described in the Patent Document 1 is composed of a power supply backup unit using a capacitor unit formed with a plurality of capacitors as an auxiliary power supply and includes an electric power supply section for enabling supply of electric power from the capacitor unit even when a battery is normal and a forcible actuation section for actuating the electric power supply section, and the operating state of the electric power supply section is checked when the battery is normal.

CONVENTIONAL ART DOCUMENT

Patent Document

[Patent Document 1] Japanese Patent Application Laid-open No. 2005-014754

DISCLOSURE OF INVENTION

Problem to be Solved by the Invention

In the conventional power supply unit for the vehicle described above, the battery and the auxiliary power supply (capacitor unit) are provided, the electric power supply section for enabling the supply of the electric power from the capacitor unit also when the battery is normal is provided, and the operating state of the electric power supply section is checked. If the capacitor unit is mounted as the auxiliary power supply on the vehicle in addition to the battery that is used normally, not only a manufacturing cost but also weight of the vehicle increase to result in poor fuel consumption.

The present invention is to solve this problem and an object of the present invention is to provide a vehicle braking apparatus in which hydraulic pressure can be supplied to wheel cylinders to secure appropriate braking forces even when a power supply unit fails, which increases reliability and safety and simplifies a structure.

Means for Solving Problem

In order to solve the above mentioned problems and to achieve the object, a vehicle braking apparatus according to the present invention includes an operation member to which an occupant can operate for braking; a master cylinder capable of outputting a predetermined hydraulic pressure by moving a piston according to an operation stroke of the operation member to pressurize a hydraulic fluid; wheel cylinders that generate braking forces for wheels by receiving the hydraulic pressure; a hydraulic passage that connects the master cylinder and the wheel cylinders; a master cut valve capable of opening and closing the hydraulic passage; a pressure control valve capable of regulating and outputting a hydraulic pressure by moving a drive valve due to an electromagnetic force based on a target control pressure according to the operation stroke of the operation member, and capable of regulating and outputting a hydraulic pressure by moving the drive valve due to a hydraulic pressure from the master cylinder as a pilot pressure; a controlled pressure passage capable of supplying the hydraulic pressure from the pressure control valve to the wheel cylinders; and a control means capable of controlling the pressure control valve and the master cut valve, wherein a pilot passage that supplies the pilot pressure to the pressure control valve is connected to the hydraulic passage on a side of the master cut valve closer to the wheel cylinders.

In the vehicle braking apparatus according to the present invention, the master cylinder is partitioned into a first pressure chamber, a second pressure chamber, and a third pressure chamber by movably supporting an input piston and a pressurizing piston as the piston in a cylinder, the hydraulic passage is connected to the first pressure chamber, the controlled pressure passage is connected to the third pressure chamber, and a stroke absorbing mechanism is provided between the input piston and the pressurizing piston.

In the vehicle braking apparatus according to the present invention, the hydraulic passage is connected to the wheel cylinder of a front wheel, the controlled pressure passage is connected to the wheel cylinder of a rear wheel, and a communication valve is provided in a communication hydraulic passage that communicates the hydraulic passage and the controlled pressure passage.

In the vehicle braking apparatus according to the present invention, the controlled pressure passage is connected to the hydraulic passage on the side of the master cut valve closer to the wheel cylinders, and a changeover valve is provided to the connection.

In the vehicle braking apparatus according to the present invention, the master cylinder is partitioned into a first pressure chamber, a second pressure chamber, and a third pressure chamber by movably supporting an input piston and a pressurizing piston as the piston in a cylinder, the first hydraulic passage as the hydraulic passage is connected to the first pressure chamber, the second hydraulic passage as the hydraulic passage is connected to the second pressure chamber, the first hydraulic passage and the second hydraulic passage are connected to the wheel cylinder for a front wheel, and the controlled pressure passage is connected to the wheel cylinders for front and rear wheels.

In the vehicle braking apparatus according to the present invention, an antilock brake system having a booster valve and a pressure reducing valve is provided between the controlled pressure passage and the wheel cylinders of the front and rear wheels and the booster valve or the pressure reducing valve functions as the changeover valve.

Effect of the Invention

The vehicle braking apparatus according to the present invention is provided with the pressure control valve in which the drive valve is moved by the electromagnetic force based on the target control pressure according to the brake operation stroke to regulate the hydraulic pressure thereby enabling to supply it to the wheel cylinders and the drive valve is moved due to the hydraulic pressure from the master cylinder as the pilot pressure to regulate the hydraulic pressure thereby enabling to supply it to the wheel cylinders. The pilot passage for supplying the pilot pressure to the pressure control valve is connected to the hydraulic passage on a side of the master cut valve closer to the wheel cylinders. Therefore, even if the power supply unit fails, the hydraulic pressure can be supplied to the wheel cylinders to secure the appropriate braking forces, which increase reliability and safety and reduces the number of electromagnetic valves to simplify the structure.

BRIEF DESCRIPTION OF DRAWINGS

FIG. 5 is a schematic block diagram illustrating a vehicle braking apparatus according to a fourth embodiment of the invention.

BEST MODES FOR CARRYING OUT THE INVENTION

Embodiments of a vehicle braking apparatus according to the present invention will be described below in detail based on the drawings. The present invention is not limited by the embodiments.

First Embodiment

Figure 1:
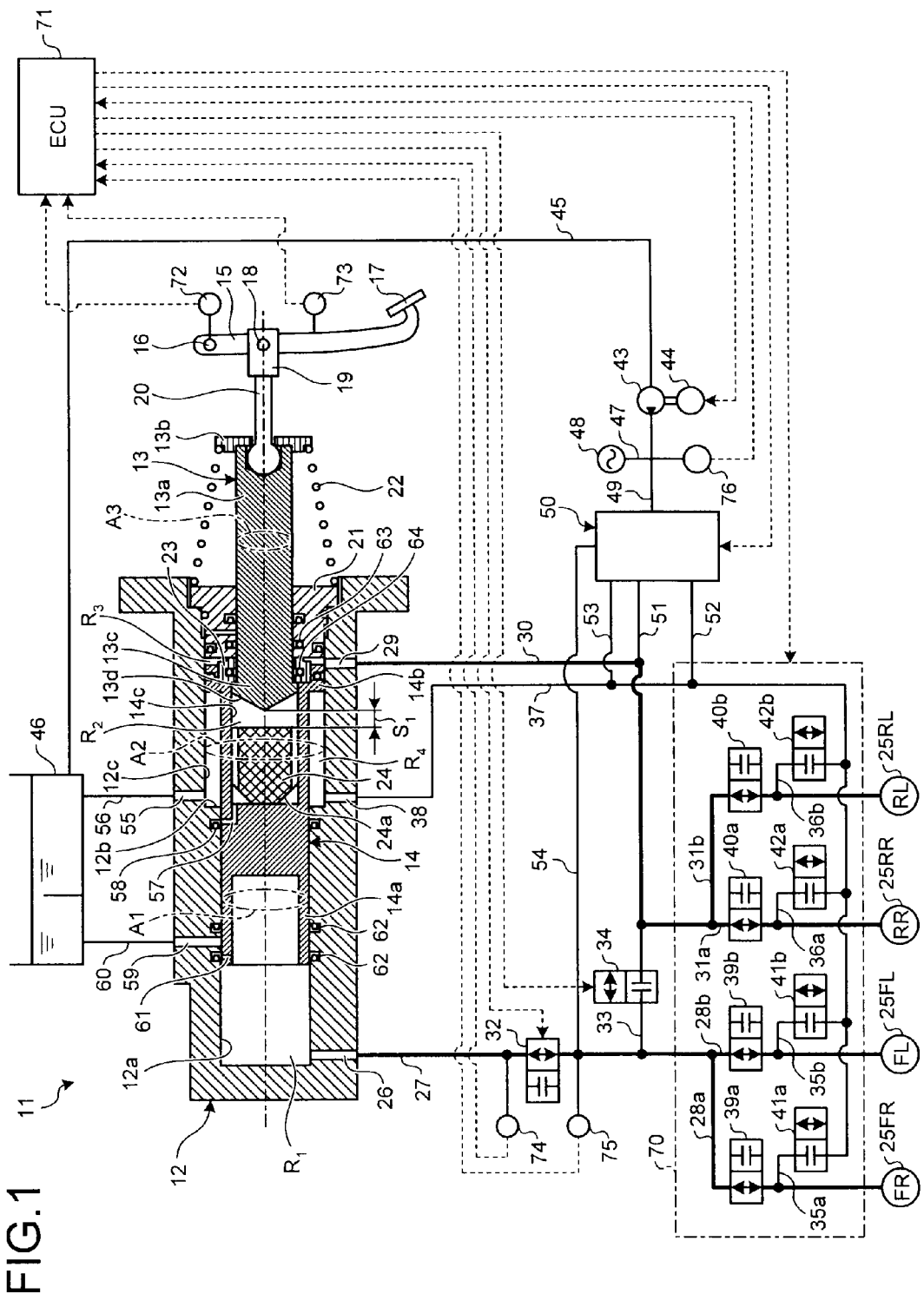
FIG. 1 is a schematic block diagram illustrating a vehicle braking apparatus according to a first embodiment of the present invention.
Figure 2:
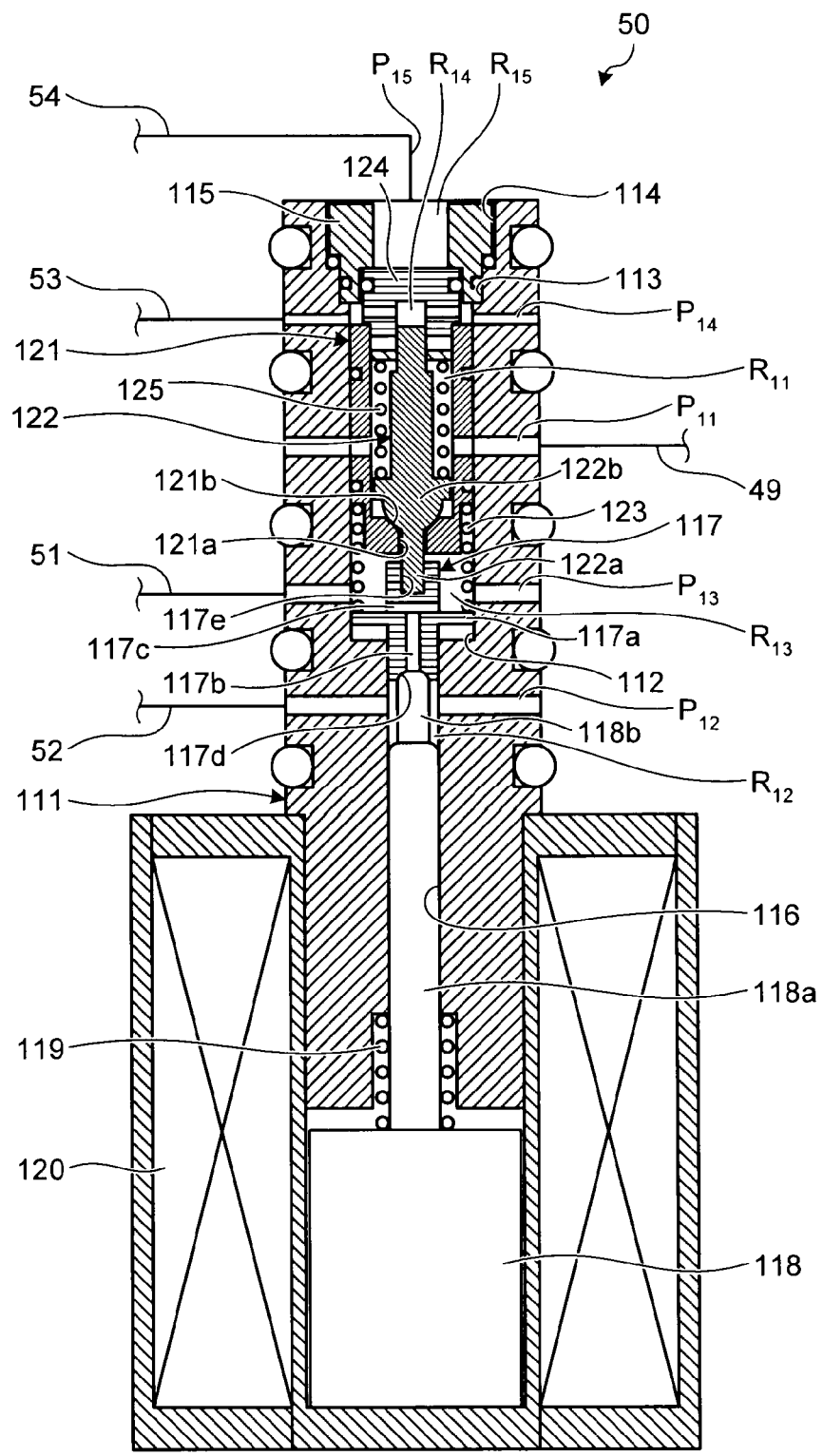
FIG. 2 is a sectional view of a pressure control valve in the vehicle braking apparatus according to the first embodiment.

FIG. 1 is a schematic block diagram illustrating a vehicle braking apparatus according to a first embodiment of the present invention. FIG. 2 is a sectional view of a pressure control valve in the vehicle braking apparatus according to the first embodiment.

In the vehicle braking apparatus according to the first embodiment, as shown in FIG. 1, a master cylinder 11 is formed by supporting an input piston 13 and a pressurizing piston 14 as pistons in a cylinder 12 in such a manner that they are movable in an axial direction. The cylinder 12 is formed in a cylindrical shape having an open base end portion and a closed tip end portion. Inside the cylinder 12, the input piston 13 and the pressurizing piston 14 are disposed coaxially and supported to be movable along the axial direction.

A brake pedal 15 as an operation member has an upper end portion supported rotatably on a mounting bracket of a vehicle body (not shown) by a support shaft 16 and a lower end portion mounted with a pedal 17 that a driver can depress. A clevis 19 is mounted to a middle portion of the brake pedal 15 by a connecting shaft 18 and a base end portion of an operation rod 20 is connected to the clevis 19. A tip end portion of the operation rod 20 of the brake pedal 15 is connected to a base end portion of the input piston 13 disposed on a base end portion side the cylinder 12.

An outer peripheral surface of the input piston 13 is movably supported by an inner peripheral surface of a supporting member 21 in a cylindrical shape press-fitted or screwed in to be fixed to an inner peripheral portion of the cylinder 12. The input piston 13 has a support portion 13a to be fitted with the inner peripheral surface of the supporting member 21, a bracket 13b fixed to the base end portion, and a pressing portion 13c having a larger diameter than the support portion 13a at a tip end portion. Between the supporting member 21 and the bracket 13b of the input piston 13, a reaction force spring 22 is interposed to support and bias the input piston 13 in one direction (rightward in FIG. 1).

The pressurizing piston 14 is disposed on the tip end portion side of the input piston 13 in the cylinder 12 and has an outer peripheral surface movably supported on an inner peripheral surface of the cylinder 12. The pressurizing piston 14 has a support portion 14a fitted with a first inner peripheral surface 12a of the cylinder 12 and a flange portion 14b fitted with a second inner peripheral surface 12c having a larger diameter and formed beside the first inner peripheral surface 12a with a step portion 12b interposed therebetween. The pressurizing piston 14 has a support hole 14c open rearward and an outer peripheral surface of the pressing portion 13c of the input piston 13 is movably fitted with an inner peripheral surface of the support hole 14c. A supporting member 23 is press-fitted or screwed into and fixed to a tip end portion of the support hole 14c, and the pressurizing piston 14 and the supporting member 23 can integrally move with respect to the support portion 13a of the input piston 13.

In the support hole 14c in the pressurizing piston 14, a rubber member 24 is disposed. The input piston 13 has a conical portion 13d for pressing the rubber member 24 on a front surface of the pressing portion 13c. On the other hand, the rubber member 24 has a rear end portion facing the conical portion 13d and in a shape of a flat surface and a front end portion having a deformation portion 24a in a shape of a truncated cone to be elastically deformed in a direction (a radial direction) intersecting a pressing direction (the axial direction) when pressing against the pressurizing piston 14.

Therefore, the input piston 13 is biased and supported by a biasing force of the reaction force spring 22 in such a position that the pressing portion 13c is to abut against the supporting member 23. If the input piston 13 moves forward against the biasing force of the reaction force spring 22, the pressing portion 13c presses the rubber member 24 to enable it to abut against a bottom surface of the support hole 14c in the pressurizing piston 14. The pressurizing piston 14 is biased and supported by the biasing force of the reaction force spring 22 through the input piston 13 in such a position that the supporting member 23 is to abut against the supporting member 21. After the pressing portion 13c presses the rubber member 24 and the rubber member 24 comes to abut against the bottom surface of the support hole 14c in the pressurizing piston 14, the input piston 13 moves further forward to thereby press the pressurizing piston 14, the input piston 13 and the pressurizing piston 14 can integrally move forward, and the tip end portion of the pressurizing piston 14 can come to abut against a bottom portion of the cylinder 12.

In this case, when the input piston 13 and the pressurizing piston 14 are positioned in retreat positions by the biasing force of the reaction force spring 22, an initial clearance $S_1$ as a stroke absorbing mechanism is set between the pressing portion 13c of the input piston 13 and the rubber member 24. In other words, when the input piston 13 moves forward only by an initial stroke (the initial clearance $S_1$), the input piston 13 does not elastically deform the rubber member 24 and the initial stroke is absorbed.

In the embodiment, the reaction force spring 22 and the rubber member 24 form a stroke simulator. When the input piston 13 moves forward, only the reaction force spring 22 is elastically deformed. When the input piston 13 moves forward a longer distance than the initial stroke $S_1$ and the rubber member 24 comes in contact with and is pressed against the pressurizing piston 14, the rubber member 24 is elastically deformed. Here, stiffness of the reaction force spring 22 changes linearly in elastic deformation while stiffness of the rubber member 24 changes nonlinearly in elastic deformation.

Therefore, if the driver depresses the pedal 17 to turn the brake pedal 15, the operating force is transmitted to the input piston 13 through the operation rod 20 and the input piston 13 can move forward against the biasing force of the reaction force spring 22. If the input piston 13 moves forward only the initial stroke $S_1$, it can elastically deform the rubber member 24. The input piston 13 presses the pressurizing piston 14 and can integrally move forward.

A relationship between pressure receiving areas of the input piston 13 and the pressurizing piston 14 is as follows. In this case, A1 is a sectional area of the support portion 14a of the pressurizing piston 14, A2 is a sectional area of the flange portion 14b of the pressurizing piston 14, and A3 is a sectional area of the support portion 13a of the input piston 13.

$$A1=A2-A3$$

By coaxially disposing the input piston 13 and the pressurizing piston 14 in the cylinder 12 so that they can move, a first pressure chamber $R_1$ is formed on a forward side (a left side in FIG. 1) of the pressurizing piston 14, a second pressure chamber $R_1$ is formed in a backward direction (a right side in FIG. 1) of the pressurizing piston 14, i.e., between the input piston 13 and the pressurizing piston 14, and a back pressure chamber (a third pressure chamber) $R_3$ is formed in a backward direction (the right side in FIG. 1) of the input piston 13 and the pressurizing piston 14, i.e., between the pressurizing piston 14 and the supporting member 23, and the supporting member 21. Between the cylinder 12 and the pressurizing piston 14, a relief chamber $R_4$ is formed.

On the other hand, wheel cylinders 25FR, 25FL, 25RR, and 25RL for actuating brake devices (braking apparatuses) are respectively provided to front wheels FR and FL and rear wheels RR and RL and can be actuated by an ABS (Antilock Brake System) 70 forming a pressure regulating means. In other words, one end portion of a first hydraulic pipe (hydraulic passage) 27 is connected to a first pressure port 26 communicating with the first pressure chamber $R_1$ of the master cylinder 11, the other end portion of the first hydraulic pipe 27 is divided into two hydraulic pressure supply pipes 28a and 28b that are connected to the wheel cylinders 25FR and 25FL of the braking apparatuses disposed at the front wheels FR and FL. One end portion of a second hydraulic pipe 30 is connected to a second pressure port 29 communicating with the back pressure chamber $R_3$ of the master cylinder 11 and the other end portion of the second hydraulic pipe 30 is divided into two hydraulic pressure supply pipes 31a and 31b that are connected to the wheel cylinders 25RR and 25RL of the braking apparatuses disposed at the rear wheels RR and RL.

A master cut valve 32 is provided to the first hydraulic pipe 27. The master cut valve 32 is a normally open electromagnetic on-off valve and is closed when electric power is supplied. A communication hydraulic pipe 33 is provided between the first hydraulic pipe 27 and the second hydraulic pipe 30 and a communication valve 34 is provided to the communication hydraulic pipe 33. The communication valve 34 is a normally closed electromagnetic on-off valve and is opened when the electric power is supplied.

Base end portions of hydraulic pressure discharge pipes 35a and 35b are connected to the respective hydraulic pressure supply pipes 28a and 28b branched from the first hydraulic pipe 27. Base end portions of hydraulic pressure discharge pipes 36a and 36b are connected to the respective hydraulic pressure supply pipes 31a and 31b branched from the second hydraulic pipe 30. Tip end portions of the respective hydraulic pressure discharge pipes 35a, 35b, 36a, and 36b gather and are connected to a third hydraulic pipe 37. A tip end portion of the third hydraulic pipe 37 is connected to a first relief port 38 communicating with the relief chamber $R_4$ of the master cylinder 11.

In the respective hydraulic pressure supply pipes 28a, 28b, 31a, and 31b, electromagnetic booster valves 39a, 39b, 40a, and 40b are disposed respectively on upstream sides (on the sides closer to first and second hydraulic pipes 27 and 30) of connections with the respective hydraulic pressure discharge pipes 35a, 35b, 36a, and 36b. In the respective hydraulic pressure discharge pipes 35a, 35b, 36a, and 36b, electromagnetic pressure reducing valves 41a, 41b, 42a, and 42b are disposed, respectively. The booster valves 39a, 39b, 40a, and 40b are normally open on-off valves and are closed when the electric power is supplied. On the other hand, the pressure reducing valves 41a, 41b, 42a, and 42b are normally closed on-off valves and are opened when the electric power is supplied.

A hydraulic pump 43 can be driven by a motor 44 and is connected to a reservoir tank 46 via a fourth hydraulic pipe 45 and connected to an accumulator 48 via a pipe 47. Therefore, if the motor 44 is driven, the hydraulic pump 43 can pressurize hydraulic oil stored in the reservoir tank 46 and supply it to the accumulator 48 and the accumulator 48 can accumulates hydraulic pressure of predetermined pressure.

The hydraulic pump 43 and the accumulator 48 are connected to a pressure control valve 50 via a high-pressure supply pipe 49. The pressure control valve 50 can regulate hydraulic pressure accumulated in the accumulator 48 with electromagnetic force and output it to the master cylinder 11 and the wheel cylinders 25FR, 25FL, 25RR, and 25RL. Therefore, the pressure control valve 50 is connected to the second hydraulic pipe 30 via a controlled pressure supply pipe 51 and connected to the third hydraulic pipe 37 via a decompressed supply pipe 52 and a relief pipe 53. The pressure control valve 50 is also connected to the first hydraulic pipe 27 via an external pressure supply pipe (pilot passage) 54. In this case, the external pressure supply pipe 54 is connected to the first hydraulic pipe 27 on a side of the master cut valve 32 closer to the ABS 70.

Here, the pressure control valve 50 forming the pressure regulating means described above will be described in detail.

In the pressure control valve 50, as shown in FIG. 2, a first support hole 112 is formed to vertically pass through a central portion of a housing 111, a mounting hole 113 and a screw hole 114 communicating with the first support hole 112 are formed in an upper portion of the housing 111, and a top of the housing 111 is open to an outside. A position-adjusting disk 115 is screwed into the screw hole 114 from outside to close a top opening of the first support hole 112.

In a lower portion of the housing 111, a second support hole 116 communicating with the first support hole 112 and having a smaller diameter than the first support hole 112 is formed. A drive piston (drive valve) 117 is fitted to be movable in the first support hole 112 and the second support hole 116 in the housing 111. The drive piston 117 is in a columnar shape and a flange portion 117*a* is integrally formed with the drive piston 117. In the drive piston 117, a first passage 117*b* axially passing through the drive piston 117 is formed and a second passage 117*c* radially passing through the drive piston 117 to intersect the first passage 117*b* is formed.

In the lower portion of the housing 111, a plunger 118 is supported to be vertically movable and is supported while biased downward by a return spring 119. The plunger 118 has a rod portion 118*a* extending upward and movably fitted in the second support hole 116 and a first valve portion 118*b* that can be seated on a first valve seat 117*d* formed on the drive piston 117. A coil 120 that can be energized is wound around an outer periphery of the plunger 118 and the plunger 118 and the coil 120 form a solenoid.

In the first support hole 112 in the housing 111, an external piston (drive valve) 121 positioned above the drive piston 117 and formed in a cylindrical shape is movably fitted. A control valve 122 is disposed in the external piston 121 and movable with respect to the external piston 121. A communication hole 121*a* is formed in the external piston 121 and a top of the external piston 121 is open. Between the flange portion 117*a* of the drive piston 117 and the external piston 121, a return spring 123 is extended, the drive piston 117 is supported while biased downward and the external piston 121 is supported while biased upward.

The control valve 122 is housed in the external piston 121 and a lid portion 124 is fixed to an upper end portion of the external piston 121. The control valve 122 has an upper end portion fitted in the lid portion 124 and a lower end portion has a connecting portion 122*a* passing through the communication hole 121*a*. The connecting portion 122*a* is fitted in a connecting recessed portion 117*e* formed in an upper end portion of the drive piston 117. The control valve 122 has a second valve portion 122*b* that can be seated on a second valve seat 121*b* formed on the external piston 121. Between the external piston 121 and the control valve 122, a return spring 125 is extended to bias the external piston 121 upward and the control valve 122 downward with its biasing force to thereby seat the second valve portion 122*b* on the second valve seat 121*b*.

As described above, by supporting the drive piston 117, the external piston 121, and the control valve 122 for moving in the housing 111, the pressure control valve 50 of the embodiment is provided with a high-pressure chamber $R_{11}$ partitioned off with the external piston 121 and the control valve 122, a decompression chamber $R_{12}$ partitioned off with the housing 111, the drive piston 117, and the plunger 118, a pressure chamber $R_{13}$ partitioned off with the housing 111, the drive piston 117, the external piston 121, and the control valve 122, a relief chamber $R_{14}$ partitioned off with the housing 111, the external piston 121, and the control valve 122, and an external pressure chamber $R_{15}$ partitioned off with the housing 111 and the external piston 121.

A high-pressure port $P_{11}$ passing through the housing 111 and the external piston 121 and communicating with the high-pressure chamber $R_{11}$ is formed and a decompression port $P_{12}$ passing through the housing 111 and communicating with the decompression chamber $R_{12}$ is formed. A controlled pressure port $P_{13}$ passing through the housing 111 and communicating with the pressure chamber $R_{13}$ is formed. A relief port $P_{14}$ passing through the housing 111 and the external piston 121 and communicating with the relief chamber $R_{14}$ is formed. An external pressure port $P_{15}$ passing through the housing 111 and communicating with the external pressure chamber $R_{15}$ is formed. The high-pressure port $P_{11}$ is connected to the high-pressure supply pipe 49, the decompression port $P_{12}$ is connected to the decompressed supply pipe 52, the controlled pressure port $P_{13}$ is connected to the controlled pressure supply pipe 51, the relief port $P_{14}$ is connected to the relief pipe 53, and the external pressure port $P_{15}$ is connected to the external pressure supply pipe 54.

In the pressure control valve 50 formed as described above, when the coil 120 is in a demagnetized state, the first valve portion 118*b* of the plunger 118 is separated by the return spring 119 from the first valve seat 117*d* of the drive piston 117. On the other hand, the second valve portion 122*b* of the control valve 122 is seated on the second valve seat 121*b* of the external piston 121 by the return spring 125. Therefore, if the communication hole 121*a* is closed, the high-pressure chamber $R_{11}$ and the pressure chamber $R_{13}$ are shut off from each other and the pressure chamber $R_{13}$ and the decompression chamber $R_{12}$ communicate with each other.

If the coil 120 is energized in this state, the plunger 118 moves upward due to generated electromagnetic force, the rod portion 118*a* presses the drive piston 117, and the drive piston 117 moves upward against a biasing force of the return spring 123. Then, the drive piston 117 presses the control valve 122 against a biasing force of the return spring 125 and the control valve 122 moves upward. If the control valve 122 moves upward, the second valve portion 122*b* moves away from the second valve seat 121*b* of the external piston 121 to open the communication hole 121*a*. As a result, the high-pressure chamber $R_{11}$ and the pressure chamber $R_{13}$ communicate with each other and the pressure chamber $R_{13}$ and the decompression chamber $R_{12}$ are shut off from each other.

If external pressure (hydraulic pressure) is supplied from the external pressure port $P_{15}$ into the external pressure chamber $R_{15}$, the external piston 121 moves downward through the lid portion 124. Then, the external piston 121 moves downward against the biasing force of the return spring 123 and the second valve portion 121*b* of the external piston 121 moves away from the second valve seat 122b of the control valve 122 to open the communication hole 121a. As a result, similarly to the above, the high-pressure chamber $R_{11}$ and the pressure chamber $R_{13}$ communicate with each other and the pressure chamber $R_{13}$ and the decompression chamber $R_{11}$ are shut off from each other.

Referring to FIG. 1 again, in the master cylinder 11, a second relief port 55 communicating with the relief chamber $R_4$ is formed in the cylinder 12 and connected to the reservoir tank 46 via a fifth hydraulic pipe 56. In the pressurizing piston 14, a first communication hole 57 that can communicate the second pressure chamber $R_2$ and the relief chamber $R_4$ is formed. Between the cylinder 12 and the pressurizing piston 14, a one-way seal 58 is provided on one side of the second relief port 55. A third relief port 59 is formed in the cylinder 12 and connected to the reservoir tank 46 through a sixth hydraulic pipe 60. In the pressurizing piston 14, a second communication hole 61 that can communicate the third relief port 59 and the first pressure chamber $R_1$ is formed. Between the cylinder 12 and the pressurizing piston 14, one-way seals 62 are provided on opposite sides of the third relief port 59.

Therefore, when the pressurizing piston 14 is in a retreat position, the second pressure chamber $R_2$ and the relief chamber $R_4$ communicate with each other through the first communication hole 57, the relief chamber $R_4$ communicates with the reservoir tank 46 through the second relief port 55, and the first pressure chamber $R_1$ and the third relief port 59 (the reservoir tank 46) communicate with each other through the second communication hole 61. If the pressurizing piston 14 is pressed by the input piston 13 and moves slightly forward, a communication between the second pressure chamber $R_2$ and the relief chamber $R_4$ are shut off from each other. As a result, the second pressure chamber $R_2$ is sealed and the input piston 13 and the pressurizing piston 14 can integrally move forward. If the pressurizing piston 14 moves slightly forward, a communication between the first pressure chamber $R_1$ and the third relief port 59 are shut off from each other. As a result, if the master cut valve 32 is in the closed state, the first pressure chamber $R_1$ is sealed and forward movement of the pressurizing piston 14 is prevented. If the master cut valve 32 is in the open state, forward movement of the pressurizing piston 14 enables supply of the controlled pressure from the first pressure chamber $R_1$ to the first hydraulic pipe 27.

The supporting member 21 is mounted with a seal member 63 between the input piston 13 and itself and the supporting member 23 integral with the pressurizing piston 14 is mounted with a seal member 64 between the input piston 13 and itself. In other words, with this structure, the input piston 13 has a seal (seal member 63) diameter on an atmosphere side and a seal (seal member 64) diameter on the pressurizing piston 14 side that are equal to each other. Therefore, when the controlled pressure acts on the back pressure chamber $R_3$ from the second pressure port 29 of the master cylinder 11, the input piston 13 does not receive pressure of the controlled pressure and a reaction force does not change either.

In the vehicle braking apparatus according to the embodiment formed as described above, as shown in FIG. 1, an electronic control unit (ECU) 71 sets target control pressure according to an operating force (a pedal depression force) input to the input piston 13 from the brake pedal 15, the pressure control valve 50 regulates pressure, and the set target control pressure acts on the back pressure chamber $R_3$ to thereby assist the pressurizing piston 14. By applying the target control pressure to the respective wheel cylinders 25FR, 25FL, 25RR, and 25RL via the ABS 70 as braking hydraulic pressure, the respective wheel cylinders 25FR, 25FL, 25RR, and 25RL are actuated to apply desired braking forces to the front wheels FR and FL and the rear wheels RR and RL.

In other words, the brake pedal 15 is provided with a stroke sensor 72 for detecting a pedal stroke Sp of the brake pedal 15 and a depression force sensor 73 for detecting the pedal depression force on the brake pedal 15 and respective detection results are output to the ECU 71. In the first hydraulic pipe 27, a first pressure sensor 74 for detecting hydraulic pressure is provided on the upstream side of the master cut valve 32, i.e., on the side closer to the first pressure port 26 and a second pressure sensor 75 for detecting hydraulic pressure is provided on the downstream side of the master cut valve 32, i.e., on the side closer to the ABS 70. When the master cut valve 32 is in the closed state, the first pressure sensor 74 detects pressure in the first pressure chamber $R_1$, the second pressure sensor 75 detects the hydraulic pressure (controlled pressure) supplied to the respective wheel cylinders 25FR, 25FL, 25RR, and 25RL of the front wheels FR and FL and the rear wheels RR and RL and respective detection results are output to the ECU 71.

Furthermore, in the high-pressure supply pipe 49 extending from the hydraulic pump 43 to the pressure control valve 50 via the accumulator 48, a third pressure sensor 76 for detecting hydraulic pressure is provided. The third pressure sensor 76 detects the hydraulic pressure accumulated in the accumulator 48 and supplied to the pressure control valve 50 and outputs a detection result to the ECU 71. Wheel speed sensors (not shown) are respectively provided to the front wheels FR and FL and the rear wheels RR and RL and output the respective detected wheel speeds to the ECU 71.

Therefore, the ECU 71 sets the target control pressure based on the pedal depression force on the brake pedal 15 detected by the depression force sensor 73 (or the pedal stroke detected by the stroke sensor 72) and controls the drive piston 117 in the pressure control valve 50. On the other hand, the controlled pressure detected by the second pressure sensor 75 is fed back to the ECU 71 and the ECU 71 carries out a control to equalize the controlled pressure with the target control pressure. In this case, the ECU 71 has a map illustrating the target control pressure corresponding to the pedal depression force (the pedal stroke) and controls the pressure control valve 50 based on the map.

Braking force control by the vehicle braking apparatus in the embodiment will be described specifically. As shown in FIGS. 1 and 2, if an occupant depresses the brake pedal 15, the operating force (depression force) causes the input piston 13 to move forward (move leftward in FIG. 1). At this time, the depression force sensor 73 detects the pedal depression force and the ECU 71 sets the target control pressure based on the pedal depression force. Then, the ECU 71 controls the pressure control valve 50 based on the target control pressure, the pressure control valve 50 regulates the hydraulic pressure accumulated in the accumulator 48, and outputs the controlled pressure equal to the target control pressure to the controlled pressure supply pipe 51.

In other words, in the pressure control valve 50, the coil 120 is energized, a generated attractive force moves the plunger 118 upward against a biasing force of the return spring 119 to press and move the drive piston 117 upward. Then, the drive piston 117 presses and moves the control valve 122 upward to open the communication hole 121a. As a result, the high-pressure port $P_{11}$ and the controlled pressure port $P_{13}$ communicate with each other while the decompression port $P_{12}$ and the controlled pressure port $P_{13}$ are shut off from each other. Therefore, the hydraulic pressure in the accumulator 48 is supplied from the high-pressure supply pipe 49 into the high-pressure port $P_{11}$, passes through the communication hole 121a from the high-pressure chamber $R_{11}$ while regulated, and is supplied from the controlled pressure port $P_{13}$ to the second hydraulic pipe 30 via the controlled pressure supply pipe 51.

Then, the hydraulic pressure supplied to the second hydraulic pipe 30 passes through the second pressure port 29 of the master cylinder 11 and acts on the back pressure chamber $R_3$. Because the input piston 13 has the seal diameter on the atmosphere side and the seal diameter on the pressurizing piston 14 side that are equal to each other, the input piston 13 moves forward irrespective of the controlled pressure and an appropriate reaction force is applied to the brake pedal 15 by the reaction force spring 22.

The controlled pressure supplied to the second hydraulic pipe 30 is applied to the wheel cylinders 25RR and 25RL of the rear wheels RR and RL via the respective hydraulic pressure supply pipes 31a and 31b. The controlled pressure supplied to the second hydraulic pipe 30 is supplied to the first hydraulic pipe 27 via the communication hydraulic pipe 33 and is applied to the wheel cylinders 25FR and 25FL of the front wheels FR and FL via the respective hydraulic pressure supply pipes 28a and 28b. At this time, the controlled pressure detected by the second pressure sensor 75 is fed back to the ECU 71 and the ECU 71 controls the pressure control valve 50 so that the target control pressure and the controlled pressure become equal to each other. As a result, the appropriate controlled pressure is applied to the wheel cylinders 25FR and 25FL of the front wheels FR and FL, the appropriately controlled pressure is applied to the wheel cylinders 25RR and 25RL of the rear wheels RR and RL, and it is possible to generate desired braking forces in the front wheels FR and FL and the rear wheels RR and RL according to the operating force on the brake pedal 15 by the occupant.

If the occupant depresses the brake pedal 15, the input piston 13 moves forward against the biasing force of the reaction force spring 22 and, as a result, only the reaction force spring 22 contracts and is deformed elastically. In this case, while the input piston 13 moves forward only by an initial stroke $S_1$, the rubber member 24 is not deformed elastically. Therefore, stiffness of the reaction force spring 22 changes linearly, the stroke is absorbed early and the reaction force changing at a constant rate is applied in response to initial operation of the brake pedal 15 by the occupant.

If the occupant further depresses the brake pedal 15 and the input piston 13 moves forward a longer distance than the initial stroke $S_1$, the rubber member 24 comes in contact with and is pressed against the pressurizing piston 14. At this time, because the master cut valve 32 is closed, if the pressurizing piston 14 moves slightly forward, a communication between the second communication hole 61 and the third relief port 59 are canceled, the first pressure chamber $R_1$ is sealed, and the pressurizing piston 14 is restrained from moving forward. As a result, the input piston 13 more strongly presses the rubber member 24 to thereby elastically deform the rubber member 24. In other words, as a result of the further forward movement of the input piston 13 against the biasing force of the reaction force spring 22, the reaction force spring 22 contracts and is deformed elastically and the rubber member 24 is pressed by the pressurizing piston 14 and contracts and is deformed elastically. Therefore, the stiffness of the reaction force spring 22 changes linearly while stiffness of the rubber member 24 changes nonlinearly in elastic deformation. The stroke is absorbed appropriately and the stable reaction force is applied in response to the adjusting operation of the brake pedal 15 by the occupant.

Moreover, when the input piston 13 moves forward and the rubber member 24 is pressed by the pressurizing piston 14 and elastically deformed, the conical portion 13d presses a central portion of the rubber member 24 and therefore the rubber member 24 is elastically deformed in such a manner that the central portion is dented. Next, a front surface of the conical portion 13d comes in close contact with and presses the whole rubber member 24 and, as a result, the pressurizing piston 14 elastically deforms the deformation portion 24a of the rubber member 24 radially outward. Therefore, when the input piston 13 elastically deforms the rubber member 24, a rate of the elastic change from an initial stage to a final stage of the elastic deformation is high and the appropriate reaction force is applied to the brake pedal 15.

On the other hand, if failure occurs in a power supply system and the system fails, it is impossible to control a current value to the coil 120 of the pressure control valve 50 so that the controlled pressure to be applied to the respective wheel cylinders 25FR, 25FL, 25RR, and 25RL become appropriate hydraulic pressure. In the embodiment, however, the pressure control valve 50 is provided with the external piston 121 actuated by pilot hydraulic pressure (external pressure) generated in the first pressure chamber $R_2$ in the master cylinder 11 and the external piston 121 can control the drive piston 117 to output the appropriate controlled pressure.

When the power supply system fails, if the occupant depresses the brake pedal 15, the input piston 13 moves forward due to the operating force. If the input piston 13 moves the longer distance than the initial stroke $S_1$, the input piston 13 presses the pressurizing piston 14 through the rubber member 24 and the input piston 13 and the pressurizing piston 14 integrally move forward. If the input piston 13 and the pressurizing piston 14 move forward, the first pressure chamber $R_1$ is pressurized. At this time, because the master cut valve 32 is open, the hydraulic pressure in the first pressure chamber $R_1$ is discharged as the external pressure into the first hydraulic pipe 27 and acts on the pressure control valve 50 via the external pressure supply pipe 54.

In the pressure control valve 50, if the external pressure acts on the external pressure chamber $R_{15}$ from the external pressure supply pipe 54 via the external pressure port $P_{15}$, the external piston 121 moves downward. As a result, the communication hole 121a is opened to thereby connect the high-pressure port $P_{11}$ and the controlled pressure port $P_{13}$ and separate the decompression port $P_{12}$ and the controlled pressure port $P_{13}$. Therefore, the hydraulic pressure in the accumulator 48 is supplied from the high-pressure supply pipe 49 to the high-pressure port $P_{11}$, passes through the communication hole 121a from the high-pressure chamber $R_{11}$ while regulated and is supplied to the pressure chamber $R_{13}$, and is then supplied to the second hydraulic pipe 30 from the controlled pressure port $P_{13}$ via the controlled pressure supply pipe 51. Then, the hydraulic pressure supplied to the second hydraulic pipe 30 acts on the back pressure chamber $R_3$ via the second pressure port 29 of the master cylinder 11 and this controlled pressure can assist the input piston 13 through the pressurizing piston 14.

As a result, the controlled pressure supplied to the second hydraulic pipe 30 is applied to the wheel cylinders 25RR and 25RL of the rear wheels RR and RL via the respective hydraulic pressure supply pipes 31a and 31b. Because of the input piston 13 that moves forward easily while assisted by the controlled pressure, the controlled pressure equal to the controlled pressure in the second hydraulic pipe 30 is discharged from the first pressure chamber $R_1$ into the first hydraulic pipe 27. As a result, the controlled pressure supplied to the first hydraulic pipe 27 is applied to the wheel cylinders 25FR and 25FL of the front wheels FR and FL via the respective hydraulic pressure supply pipes 28a and 28b. Therefore, the appropriate controlled pressure is applied to the wheel cylinders 25FR and 25FL of the front wheels FR and FL and the appropriate controlled pressure is applied to the wheel cylinders 25RR and 25RL of the rear wheels RR and RL and it is possible to generate desired braking forces for the front wheels FR and FL and the rear wheels RR and RL according to the operating force by the occupant on the brake pedal 15.

Even if remaining pressure in the accumulator 48 is insufficient, if the occupant depresses the brake pedal 15, the input piston 13 moves forward due to the operating force to press the pressurizing piston 14 through the rubber member 24 and move forward to pressurize the first pressure chamber $R_1$. Therefore, the hydraulic pressure according to the depression force is discharged from the first pressure chamber $R_1$ into the first hydraulic pipe 27 and, as a result, the hydraulic pressure can be applied to the wheel cylinders 25FR and 25FL of the front wheels FR and FL and it is possible to generate the braking forces for the front wheels FR and FL according to the operating force by the occupant on the brake pedal 15.

As described above, in the vehicle braking apparatus in the first embodiment, the master cylinder 11 in which the input piston 13 and the pressurizing piston 14 are movably supported in series in the cylinder 12 to partition the first pressure chamber $R_1$ and the second pressure chamber $R_2$ is provided, the respective wheel cylinders 25FR, 25FL, 25RR, and 25RL are connected to the first hydraulic pipe 27 connected to the first pressure chamber $R_1$ via the ABS 70, the master cut valve 32 is provided in the first hydraulic pipe 27, and the electronically controllable pressure control valve 50 is connected to the respective wheel cylinders 25FR, 25FL, 25RR, and 25RL via the ABS 70.

Therefore, when the power supply system is normal, it is possible to control the pressure control valve 50 to thereby regulate the hydraulic pressure of the accumulator 48 and supply it to the respective wheel cylinders 25FR, 25FL, 25RR, and 25RL. When the power supply system fails, on the other hand, by actuating the pressure control valve 50 with the external pressure according to the operation of the brake pedal 15, it is possible to regulate the hydraulic pressure of the accumulator 48 to supply it to the respective wheel cylinders 25FR, 25FL, 25RR, and 25RL. In other words, by using the pressure control valve 50 actuated by the electromagnetic force and the external pressure, it is possible to reliably generate the controlled pressure according to the operation of the brake pedal 15 by the occupant irrespective of the state of the power supply system. As a result, the hydraulic path can be simplified to simplify the structure, manufacturing cost can be reduced, appropriate control of the braking force can be achieved, and reliability and safety can be increased.

Moreover, in the vehicle braking apparatus in the first embodiment, by moving the drive piston 117 of the pressure control valve 50 according to the brake operation amount of the brake pedal 15, it is possible to regulate the hydraulic pressure to supply it to the wheel cylinders 25FR, 25FL, 25RR, and 25RL. By moving the external piston 121 of the pressure control valve 50 by using the hydraulic pressure output from the master cylinder 11 as the pilot pressure, it is possible to regulate the hydraulic pressure to supply it to the wheel cylinders 25RR and 25RL. The master cut valve 32 capable of opening and closing the first hydraulic pipe 27 for supplying the hydraulic pressure from the master cylinder 11 to the wheel cylinders 25FR and 25FL is provided. The external pressure supply pipe 54 for supplying the pilot pressure to the pressure control valve 50 is connected to the first hydraulic pipe 27 on the side of the master cut valve 32 closer to the wheel cylinders 25FR and 25FL.

In this way, when the power supply system is normal, the master cut valve 32 is in the closed state and therefore the external pressure supply pipe 54 and the first pressure chamber $R_1$ in the master cylinder 11 are shut off from each other. Therefore, the hydraulic pressure of the first pressure chamber $R_1$ does not act on the pressure control valve 50 and regenerative cooperative control is possible. When the power supply system fails, the master cut valve 32 is in the open state and therefore the external pressure supply pipe 54 and the first pressure chamber $R_1$ in the master cylinder 11 communicate with each other. As a result, the hydraulic pressure of the first pressure chamber $R_1$ in the master cylinder 11 can be applied to the pressure control valve 50 as the external pressure. Therefore, the regenerative cooperative control can be carried out without adding a new electromagnetic valve and it is possible to simplify the structure.

Moreover, in the vehicle braking apparatus in the first embodiment, in the master cylinder 11, the first hydraulic pipe 27 is connected to the first pressure chamber $R_1$, the controlled pressure supply pipe 51 to which the hydraulic pressure from the pressure control valve 50 is supplied is connected to the back pressure chamber $R_3$ via the second hydraulic pipe 30, the initial clearance $S_1$ is provided between the input piston 13 and the pressurizing piston 14, the first hydraulic pipe 27 is connected to the wheel cylinders 25FR and 25FL of the front wheels, the controlled pressure supply pipe 51 is connected to the wheel cylinders 25RR and 25RL of the rear wheels, the first hydraulic pipe 27 and the second hydraulic pipe 30 are connected by the communication hydraulic pipe 33, and the communication valve 34 is provided in the communication hydraulic pipe 33. Therefore, with the simple structure, it is possible to secure the appropriate braking hydraulic pressure both when the power supply system is normal and fails. In this way, the structure can be simplified and reliability and safety can be increased.

In the vehicle braking apparatus according to the first embodiment, the stroke simulator for absorbing the stroke according to the brake operating force and generating the reaction force is mounted in the master cylinder 11. The stroke simulator is made up of the reaction force spring 22 extended between the input piston 13 and the cylinder 12 and the rubber member 24 provided between the input piston 13 and the pressurizing piston 14. As an elastic deformation suppressing means for suppressing elastic deformation of the rubber member 24 while the input piston 13 moves forward over the initial stroke, the initial clearance $S_1$ is set between the input piston 13 and the pressurizing piston 14.

Therefore, after the input piston 13 moves forward due to the initial brake operating force to elastically deform the reaction force spring 22 only and the input piston 13 moves forward over the initial stroke, the rubber member 24 is elastically deformed. By securing an ideal absorption stroke and a braking reaction force according to the brake operating force, it is possible to improve a brake operating feeling.

If the occupant depresses the brake pedal 15, the input piston 13 moves forward, only the reaction force spring 22 contracts and is elastically deformed. Because the stiffness of the reaction force spring 22 changes linearly, the stroke can be absorbed early and the reaction force changing at the constant rate can be applied in response to the initial operation of the brake pedal 15 by the occupant. Then, if the occupant further depresses the brake pedal 15, the rubber member 24 is elastically deformed after the input piston 13 moves forward a longer distance than the initial stroke. Because the stiffness of the rubber member 24 changes nonlinearly, the stroke can be absorbed appropriately and the stable reaction force can be applied in response to the adjusting operation of the brake pedal 15 by the occupant.

Moreover, the stroke simulator including the reaction force spring 22 and the rubber member 24 as components is mounted in the master cylinder 11. Therefore, it is possible to make the device compact.

Second Embodiment

Figure 3:
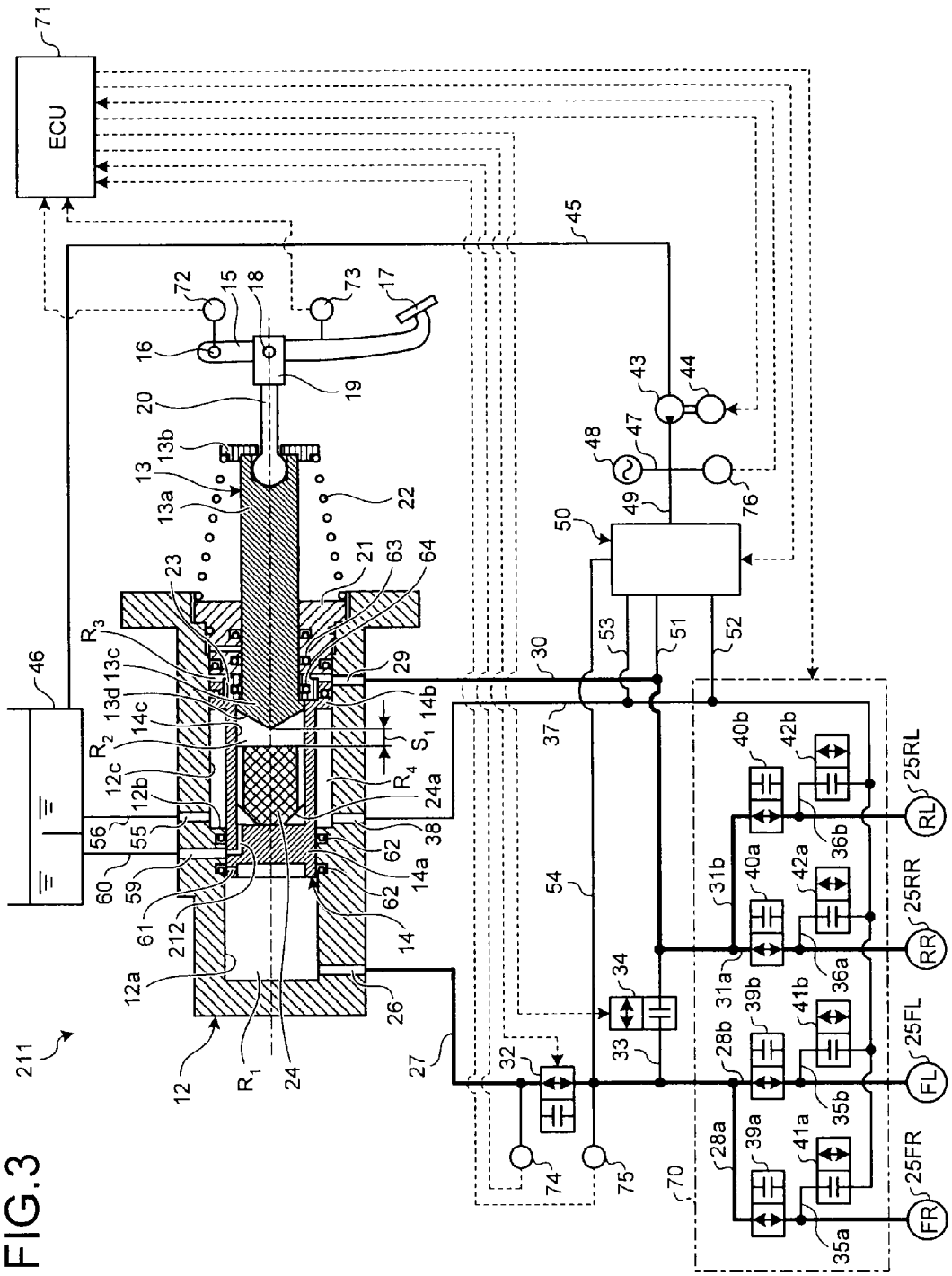
FIG. 3 is a schematic block diagram illustrating a vehicle braking apparatus according to a second embodiment of the invention.

FIG. 3 is a schematic block diagram illustrating a vehicle braking apparatus according to a second embodiment of the invention. Members having similar functions to those described in the above-described embodiment will be provided with the same reference numerals and will not be described repeatedly.

In the vehicle braking apparatus according to the second embodiment, as shown in FIG. 3, a master cylinder 211 is formed by supporting the input piston 13 and the pressurizing piston 14 in the cylinder 12 in such a manner that they are movable in an axial direction. A tip end portion of the operation rod 20 of the brake pedal 15 is connected to the input piston 13. The input piston 13 is movably supported by an inner peripheral surface of the supporting member 21 fixed to the cylinder 12 and is supported while biased in one direction (rightward in FIG. 3) by a biasing force of the reaction force spring 22.

The pressurizing piston 14 is disposed and movably supported on a tip end portion side of the input piston 13 in the cylinder 12. In the pressurizing piston 14, the pressing portion 13c of the input piston 13 is movably fitted in the support hole 14c and the supporting member 23 is fixed to a tip end portion of the support hole 14c. As a result, the pressurizing piston 14 and the supporting member 23 can integrally move with respect to the support portion 13a of the input piston 13. In the pressurizing piston 14, the rubber member 24 is disposed in the support hole 14c.

By coaxially disposing the input piston 13 and the pressurizing piston 14 in the cylinder 12 so that they can move, a first pressure chamber $R_1$, a second pressure chamber $R_2$, a back pressure chamber $R_3$, and a relief chamber $R_4$ are formed. The first hydraulic pipe 27 is connected to the first pressure port 26 of the first pressure chamber $R_1$, the second hydraulic pipe 30 is connected to the second pressure port 29 of the back pressure chamber $R_3$, the third hydraulic pipe 37 is connected to the first relief port 38 of the relief chamber $R_4$, and the fifth hydraulic pipe 56 is connected to the second relief port 55.

In the master cylinder 211, the third relief port 59 is formed in the cylinder 12 and connected to the reservoir tank 46 through the sixth hydraulic pipe 60. In the pressurizing piston 14, the second communication hole 61 that can communicate the first pressure chamber $R_1$ and the third relief port 59 is formed and a third communication hole 212 that can communicate the second pressure chamber $R_2$ and the third relief port 59 is formed. Between the cylinder 12 and the pressurizing piston 14, the one-way seals 62 are provided on opposite sides of the third relief port 59.

Therefore, when the pressurizing piston 14 is in a retreat position, the first pressure chamber $R_1$ and the third relief port 59 communicate with each other through the second communication hole 61 and the second pressure chamber $R_2$ and the third relief port 59 communicate with each other through the third communication hole 212. If the pressurizing piston 14 is pressed by the input piston 13 and moves slightly forward, a communication between the first pressure chamber $R_1$ and the third relief port 59 are shut off from each other. As a result, if the master cut valve 32 is in the closed state, the first pressure chamber $R_1$ is sealed and forward movement of the pressurizing piston 14 is prevented. If the master cut valve 32 is in the open state, forward movement of the pressurizing piston 14 enables supply of the controlled pressure from the first pressure chamber $R_1$ to the first hydraulic pipe 27. When the master cut valve 32 is in the open state, if the pressurizing piston 14 moves further forward, a communication between the second pressure chamber $R_2$ is shut off from the third relief port 59 and communicates with the first pressure chamber $R_1$ and therefore the input piston 13 and the pressurizing piston 14 can integrally move forward.

In the vehicle braking apparatus according to the embodiment, a master cut valve, an ABS, wheel cylinders, and a pressure control valve are connected to the master cylinder 211 described above. Their structures are similar to those described in the first embodiment and therefore will not be described.

With regard to braking force control by the vehicle braking apparatus according to the embodiment, if an occupant depresses the brake pedal 15, the input piston 13 moves forward due to the operating force (depression force). At this time, the depression force sensor 73 detects the pedal depression force and the ECU 71 sets target control pressure based on the pedal depression force. Then, the ECU 71 controls the pressure control valve 50 based on the target control pressure and the pressure control valve 50 regulates hydraulic pressure accumulated in the accumulator 48 and outputs the controlled pressure equal to the target control pressure to the controlled pressure supply pipe 51.

By the pressure control valve 50, the hydraulic pressure in the accumulator 48 is regulated and supplied to the second hydraulic pipe 30 via the controlled pressure supply pipe 51. Then, the controlled pressure is applied to the wheel cylinders 25RR and 25RL of rear wheels RR and RL via respective hydraulic pressure supply pipes 31a and 31b. The controlled pressure is also supplied to the first hydraulic pipe 27 via the communication hydraulic pipe 33 and applied to the wheel cylinders 25FR and 25FL of front wheels FR and FL via respective hydraulic pressure supply pipes 28a and 28b. Therefore, appropriate controlled pressure is applied to the wheel cylinders 25FR and 25FL of front wheels FR and FL, appropriate controlled pressure is applied to the wheel cylinders 25RR and 25RL of rear wheels RR and RL, and it is possible to generate desired braking forces for the front wheels FR and FL and the rear wheels RR and RL according to the operating force on the brake pedal 15 by the occupant.

On the other hand, when failure occurs in a power supply system and the system fails, if the occupant depresses the brake pedal 15, the input piston 13 moves forward due to the operating force. If the input piston 13 moves a longer distance than an initial stroke $S_1$, the input piston 13 presses the pressurizing piston 14 through the rubber member 24 and the input piston 13 and the pressurizing piston 14 integrally move forward. If the input piston 13 and the pressurizing piston 14 move forward, the first pressure chamber $R_1$ is pressurized. At this time, because the master cut valve 32 is open, the hydraulic pressure in the first pressure chamber $R_1$ is discharged as external pressure into the first hydraulic pipe 27 and acts on the pressure control valve 50 via the external pressure supply pipe 54.

If the external pressure acts on the pressure control valve 50, the hydraulic pressure in the accumulator 48 is regulated and supplied to the second hydraulic pipe 30 via the controlled pressure supply pipe 51. Then, similarly to the above description, the controlled pressure supplied to the second hydraulic pipe 30 acts on the back pressure chamber $R_3$ via the second pressure port 29 of the master cylinder 11 and this controlled pressure can assist the input piston 13 through the pressurizing piston 14.

As a result, the controlled pressure supplied to the second hydraulic pipe 30 is applied to the wheel cylinders 25RR and 25RL of the rear wheels RR and RL via the respective hydraulic pressure supply pipes 31a and 31b. Because of the input piston 13 that moves forward easily while assisted by the controlled pressure, the controlled pressure equal to the controlled pressure in the second hydraulic pipe 30 is discharged from the first pressure chamber $R_1$ into the first hydraulic pipe 27. As a result, the controlled pressure supplied to the first hydraulic pipe 27 is applied to the wheel cylinders 25FR and 25FL of the front wheels FR and FL via the respective hydraulic pressure supply pipes 28a and 28b. Therefore, the appropriate controlled pressure is applied to the wheel cylinders 25FR and 25FL of the front wheels FR and FL and the appropriate controlled pressure is applied to the wheel cylinders 25RR and 25RL of the rear wheels RR and RL and it is possible to generate desired braking forces for the front wheels FR and FL and the rear wheels RR and RL according to the operating force by the occupant on the brake pedal 15.

As described above, in the vehicle braking apparatus according to the second embodiment, the master cut valve 32 capable of opening and closing the first hydraulic pipe 27 for supplying the hydraulic pressure from the master cylinder 11 to the wheel cylinders 25FR and 25FL is provided. The external pressure supply pipe 54 for supplying the pilot pressure to the pressure control valve 50 is connected to the first hydraulic pipe 27 on the side of the master cut valve 32 closer to the wheel cylinders 25FR and 25FL.

In this way, when the power supply system is normal, the master cut valve 32 is in the closed state and therefore the external pressure supply pipe 54 and the first pressure chamber $R_1$ in the master cylinder 11 are shut off from each other. Therefore, the hydraulic pressure of the first pressure chamber $R_1$ does not act on the pressure control valve 50 and regenerative cooperative control is possible. When the power supply system fails, the master cut valve 32 is in the open state and therefore the external pressure supply pipe 54 and the first pressure chamber $R_1$ in the master cylinder 11 communicate with each other. As a result, the hydraulic pressure of the first pressure chamber $R_1$ in the master cylinder 11 can be applied to the pressure control valve 50 as the external pressure. Therefore, the regenerative cooperative control can be carried out without adding a new electromagnetic valve and it is possible to simplify the structure.

Third Embodiment

Figure 4:
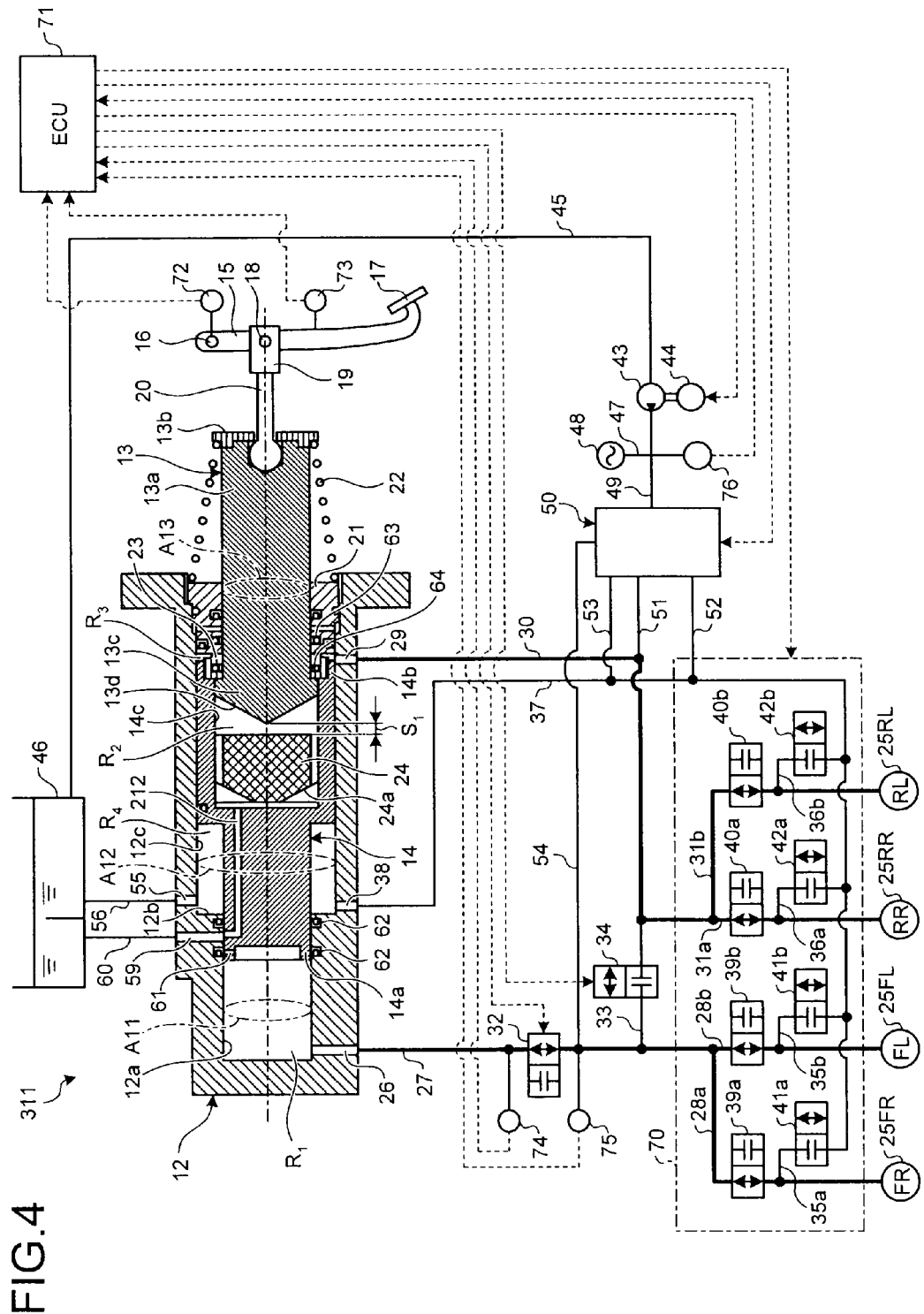
FIG. 4 is a schematic block diagram illustrating a vehicle braking apparatus according to a third embodiment of the invention.

FIG. 4 is a schematic block diagram illustrating a vehicle braking apparatus according to a third embodiment of the invention. Members having similar functions to those described in the above-described embodiments will be provided with the same reference numerals and repetition will not be described repeatedly.

In the vehicle braking apparatus according to the third embodiment, as shown in FIG. 4, a master cylinder 311 is formed by supporting the input piston 13 and the pressurizing piston 14 in the cylinder 12 in such a manner that they are movable in an axial direction. A tip end portion of the operation rod 20 of the brake pedal 15 is connected to the input piston 13. The input piston 13 is movably supported by an inner peripheral surface of the supporting member 21 fixed to the cylinder 12 and is supported while biased in one direction (rightward in FIG. 4) by a biasing force of the reaction force spring 22.

The pressurizing piston 14 is disposed and movably supported on a tip end portion side of the input piston 13 in the cylinder 12. In the pressurizing piston 14, the pressing portion 13c of the input piston 13 is movably fitted in the support hole 14c and the supporting member 23 is fixed to a tip end portion of the support hole 14c. As a result, the pressurizing piston 14 and the supporting member 23 can integrally move with respect to the support portion 13a of the input piston 13. In the pressurizing piston 14, the rubber member 24 is disposed in the support hole 14c.

In the embodiment, a relationship between pressure receiving areas of the input piston 13 and the pressurizing piston 14 is as follows. In this case, A11 is a sectional area of the support portion 14a of the pressurizing piston 14, A12 is a sectional area of the flange portion 14b of the pressurizing piston 14, and A13 is a sectional area of the support portion 13a of the input piston 13.

$$A11=A13$$

Because a seal diameter of the input piston 13 and a seal diameter of the pressurizing piston 14 are set to be equal, an input load generated by the forward movement of the input piston 13 and controlled hydraulic pressure (master cylinder pressure gradient) generated by the forward movement of the pressurizing piston 14 become equal, maximum generated hydraulic pressure that can be generated by the master cylinder 311 increases, and a linear braking characteristic can be secured.

In the vehicle braking apparatus according to the embodiment, a master cut valve, an ABS, wheel cylinders, and a pressure control valve are connected to the master cylinder 311 described above. Their structures and operations are similar to those in the first and the second embodiments described above and therefore will not be described.

As described above, in the vehicle braking apparatus according to the third embodiment, the master cut valve 32 capable of opening and closing the first hydraulic pipe 27 for supplying the hydraulic pressure from the master cylinder 11 to the wheel cylinders 25FR and 25FL is provided. The external pressure supply pipe 54 for supplying the pilot pressure to the pressure control valve 50 is connected to the first hydraulic pipe 27 on the side of the master cut valve 32 closer to the wheel cylinders 25FR and 25FL.

In this way, when the power supply system is normal, the master cut valve 32 is in the closed state and therefore the external pressure supply pipe 54 and the first pressure chamber $R_1$ in the master cylinder 11 are shut off from each other. Therefore, the hydraulic pressure of the first pressure chamber $R_1$ does not act on the pressure control valve 50 and regenerative cooperative control is possible. When the power supply system fails, the master cut valve 32 is in the open state and therefore the external pressure supply pipe 54 and the first pressure chamber $R_1$ in the master cylinder 11 communicate with each other. As a result, the hydraulic pressure of the first pressure chamber $R_1$ in the master cylinder 11 can be applied to the pressure control valve 50 as the external pressure. Therefore, the regenerative cooperative control can be carried out without adding a new electromagnetic valve and it is possible to simplify the structure.

Fourth Embodiment

Figure 5:
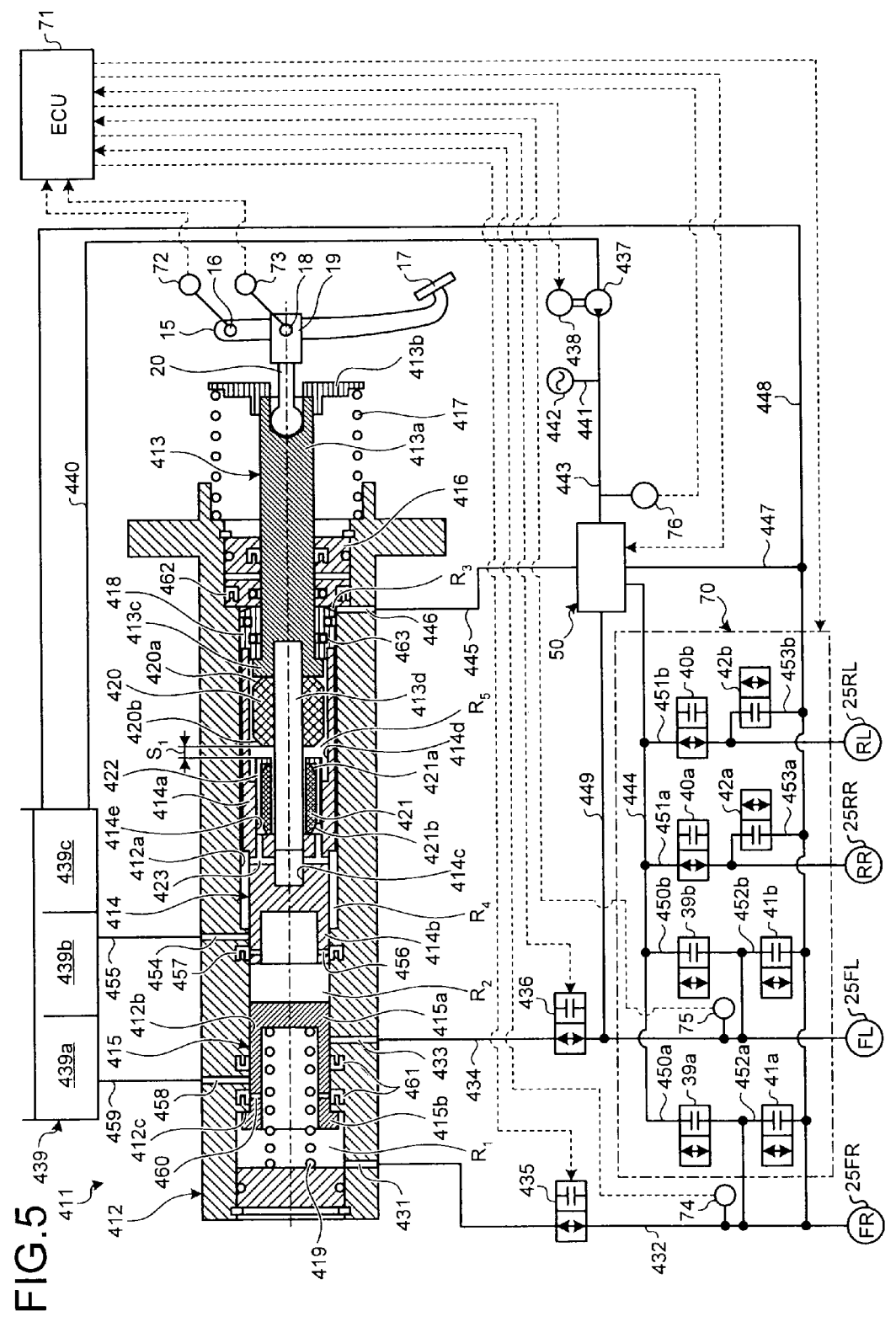

FIG. 5 is a schematic block diagram illustrating a vehicle braking apparatus according to an fourth embodiment of the invention. Members having similar functions to those described in the above-described embodiments will be provided with the same reference numerals and will not be described repeatedly.

In the vehicle braking apparatus according to the fourth embodiment, as shown in FIG. 5, a master cylinder 411 is formed by supporting an input piston 413, a middle piston 414, and a pressurizing piston 415 as pistons in a cylinder 412 in such a manner that they are movable in an axial direction. The operation rod 20 of the brake pedal 15 is connected to the input piston 413.

The input piston 413 is movably supported by an inner peripheral surface of a supporting member 416 having an outer peripheral surface fixed to an inner peripheral portion of the cylinder 412. The input piston 413 has a support portion 413a to be fitted with the inner peripheral surface of the supporting member 416, a bracket 413b fixed to a base end portion, a pressing portion 413c having a larger diameter than the support portion 413a at a tip end portion, and a connecting portion 413d extending forward from the pressing portion 413c. Between the supporting member 416 and the bracket 413b of the input piston 413, a reaction force spring (first elastic member) 417 is interposed to support the input piston 413 while biasing it in one direction (rightward in FIG. 5).

The middle piston 414 is disposed between the input piston 413 and the pressurizing piston 415 in the cylinder 412 and has an outer peripheral surface movably supported on an inner peripheral surface of the cylinder 412. The middle piston 414 has a first support portion 414a fitted with a first inner peripheral surface 412a of the cylinder 412 and a second support portion 414b fitted with a second inner peripheral surface 412b having a smaller diameter than the first inner peripheral surface 412a. The middle piston 414 has a first support hole 414d and a second support hole 414e open rearward in the first support portion 414a and a connecting hole 414c formed in a bottom portion of the second support hole 414e. In the middle piston 414, the pressing portion 413c of the input piston 413 enters the first support hole 414d and a tip end portion of the connecting portion 413d is movably fitted in the connecting hole 414c. A supporting member 418 is fixed to a tip end portion of the first support hole 414d to be movable with respect to the input piston 413.

Therefore, the input piston 413 is biased and supported by the reaction force spring 417 in such a position that the pressing portion 413c is to abut against the supporting member 418 integral with the middle piston 414. If the input piston 413 moves forward against a biasing force of the reaction force spring 417, the connecting portion 413d can come to abut against a bottom surface of the connecting hole 414c in the middle piston 414. The middle piston 414 is biased and supported by the biasing force of the reaction force spring 417 in such a position that the supporting member 418 is to abut against the supporting member 416 through the input piston 413. After the connecting portion 413d comes to abut against the bottom surface of the connecting hole 414c in the middle piston 414, the input piston 413 moves further forward to thereby press the middle piston 414, and the input piston 413 and the middle piston 414 can integrally move forward.

The pressurizing piston 415 is disposed on a tip end portion side of the middle piston 414 in the cylinder 412 and has an outer peripheral surface movably supported on an inner peripheral surface of the cylinder 412. The pressurizing piston 415 has a support portion 415a fitted with the second inner peripheral surface 412b of the cylinder 412 and a stopper portion 415b that can come to abut against a step portion 412c. Between the cylinder 412 and the pressurizing piston 415, a biasing spring 419 is extended and the pressurizing piston 415 is biased and supported by a biasing force of the biasing spring 419 in such a position that the stopper portion 415b is to abut against the step portion 412c. The input piston 413 moves further forward after coming to abut against the middle piston 414 to thereby press the pressurizing piston 415. Then, the input piston 413, the middle piston 414, and the pressurizing piston 415 can integrally move forward.

A first rubber member 420 is disposed at a base end portion of the connecting portion 413d of the input piston 413. A cover 422 through which the connecting portion 413d passes is movably supported in the second support hole 414e in the middle piston 414 and a second rubber member 421 is disposed in the cover 422. In the embodiment, the first rubber member 420 and the second rubber member 421 form a second elastic member. Formed at front and rear portions of the first rubber member 420 are deformation portions 420a and 420b formed in shapes of truncated cones to be elastically deformed in a direction (a radial direction) intersecting a pressing direction (an axial direction) when pressed by the input piston 413. Formed at front and rear portions of the second rubber member 421 are front and rear deformation portions 421a and 421b formed in shapes of truncated cones to be elastically deformed in the direction (the radial direction) intersecting the pressing direction (the axial direction) when pressed by the input piston 413.

The first rubber member 420 is the same as the second rubber member 421 in length but greater than the second rubber member 421 in outside diameter. A minute clearance is set between an inner peripheral surface of the first rubber member 420 and the first support hole 414d and a minute clearance is set between an inner peripheral surface of the second rubber member 421 and the connecting portion 413d. In other words, the first rubber member 420 and the second rubber member 421 have different elasticity (spring constants) due to different shapes and mounted positions.

When the input piston 413 and the middle piston 414 are positioned in retreat positions by the biasing force of the reaction force spring 417, an initial clearance $S_1$ as a stroke absorbing mechanism is set between the first rubber member 420 and the cover 422 (the second rubber member 421). In other words, when the input piston 413 moves forward only by an initial stroke (the initial clearance $S_1$), the input piston 413 does not elastically deform the respective rubber members 420 and 421 and the initial stroke is absorbed.

In the embodiment, the input piston 413, the reaction force spring 417, and the rubber members 420 and 421 form a stroke simulator. When the input piston 413 moves forward, only the reaction force spring 417 is elastically deformed. When the input piston 413 moves forward a longer distance than the initial stroke $S_1$ and the first rubber member 420 comes in contact with and is pressed against the cover 422, the first rubber member 420 is elastically deformed and then the second rubber member 421 is elastically deformed. Here, stiffness of the reaction force spring 417 changes linearly in elastic deformation while stiffness of the rubber members 420 and 421 changes nonlinearly in elastic deformation.

Therefore, if the driver depresses the pedal 17 to turn the brake pedal 15, the operating force is transmitted to the input piston 413 through the operation rod 20 and the input piston 413 moves forward against the biasing force of the reaction force spring 417. If the input piston 413 moves forward over the initial stroke $S_1$, it can elastically deform the rubber members 420 and 421 and bring them to abut against the middle piston 414. The input piston 413 presses the middle piston 414 and can integrally move forward. Then, if the input piston 413 and the middle piston 414 integrally move forward and the middle piston 414 comes to abut against the pressurizing piston 415, the input piston 413 and the middle piston 414 press the pressurizing piston 415 and can integrally move forward.

By coaxially disposing the input piston 413, the middle piston 414, and the pressurizing piston 415 in the cylinder 412 so that they can move, a first pressure chamber $R_1$, a second pressure chamber $R_2$, a back pressure chamber $R_3$, a first relief chamber $R_4$, and a second relief chamber $R_5$ are formed. In this case, the first relief chamber $R_4$ and the second relief chamber $R_5$ communicate with each other through a communication path 423 and the connecting hole 414c formed in the middle piston 414.

On the other hand, wheel cylinders 25FR, 25FL, 25RR, and 25RL for actuating the brake devices (braking apparatuses) are respectively provided to the front wheels FR and FL and the rear wheels RR and RL and can be actuated by the ABS (Antilock Brake System) 70 forming a pressure regulating means. In other words, one end portion of a first hydraulic pipe (hydraulic passage) 432 is connected to a first pressure port 431 communicating with the first pressure chamber $R_1$ in the master cylinder 411 and the other end portion of the first hydraulic pipe 432 is connected to the wheel cylinder 25FR. One end portion of a second hydraulic pipe (hydraulic passage) 434 is connected to a second pressure port 433 communicating with the second pressure chamber $R_2$ in the master cylinder 411 and the other end portion of the second hydraulic pipe 434 is connected to the wheel cylinder 25FL. A first master cut valve 435 is provided in the first hydraulic pipe 432 and a second master cut valve 436 is provided to the second hydraulic pipe 434. The master cut valves 435 and 436 are normally open electromagnetic on-off valves and are closed when the electric power is supplied.

A hydraulic pump 437 can be driven by a motor 438. A reservoir tank 439 is divided into three reservoir portions 439a, 439b, and 439c. The hydraulic pump 437 is connected to the third reservoir portion 439c of the reservoir tank 439 through a third hydraulic pipe 440 and connected to an accumulator 442 through a pipe 441. Therefore, if the motor 438 is driven, the hydraulic pump 437 pressurizes the hydraulic oil stored in the reservoir tank 439 to supply it to the accumulator 442 and the accumulator 442 can accumulate hydraulic pressure of predetermined pressure.

The hydraulic pump 437 and the accumulator 442 are connected to the pressure control valve 50 through a high-pressure supply pipe 443. The pressure control valve 50 can regulate the hydraulic pressure accumulated in the accumulator 442 with electromagnetic force and output it to the master cylinder 411 and the wheel cylinders 25FR, 25FL, 25RR, and 25RL. Therefore, the pressure control valve 50 is connected to the ABS 70 via a first controlled pressure supply pipe 444, connected to a third pressure port 446 communicating with the back pressure chamber $R_3$ in the master cylinder 411 via a second controlled pressure supply pipe 445, connected to a fourth hydraulic pipe 448 via a decompressed supply pipe 447, and the fourth hydraulic pipe 448 is connected to the third reservoir portion 439c of the reservoir tank 439. The pressure control valve 50 is connected to the second hydraulic pipe 434 via an external pressure supply pipe (pilot passage) 449. In this case, the external pressure supply pipe 449 is connected to the second hydraulic pipe 434 on a side of the master cut valve 436 closer to the ABS 70.

The pressure control valve 50 is similar to that described in the above-described first embodiment and will not be described in detail.

In the ABS 70, the first controlled pressure supply pipe 444 is divided into four hydraulic pressure supply pipes 450a, 450b, 451a, and 451b and the two hydraulic pressure supply pipes 450a and 450b are connected to the wheel cylinders 25FR and 25FL of the brake devices disposed at the front wheels FR and FL. In other words, the hydraulic pressure supply pipe 450a is connected to the first hydraulic pipe 432 and the hydraulic pressure supply pipe 450b is connected to the second hydraulic pipe 434. The hydraulic pressure supply pipes 451a and 451b are connected to the wheel cylinders 25RR and 25RL of the brake devices disposed at the rear wheels RR and RL. Base end portions of hydraulic pressure discharge pipes 452a, 452b, 453a, and 453b are connected to the respective hydraulic pressure supply pipes 450a, 450b, 451a, and 451b. Tip end portions of the respective hydraulic pressure discharge pipes 452a, 452b, 453a, and 453b gather and are connected to the fourth hydraulic pipe 448.

In the respective hydraulic pressure supply pipes 450a, 450b, 451a, and 451b, electromagnetic booster valves 39a, 39b, 40a, and 40b are disposed respectively on upstream sides (on sides closer to the second controlled pressure supply pipe 444) of connections with the respective hydraulic pressure discharge pipes 452a, 452b, 453a, and 453b. In the respective hydraulic pressure discharge pipes 452a, 452b, 453a, and 453b, electromagnetic pressure reducing valves 41a, 41b, 42a, and 42b are disposed, respectively. The booster valves 39a and 39b and the pressure reducing valves 41a, 41b, 42a, and 42b are normally closed on-off valves and are opened when the electric power is supplied. On the other hand, the booster valves 40a and 40b are normally open on-off valves and are closed when the electric power is supplied.

In the embodiment, changeover valves capable of changing the system are provided at a connection between the first and the second hydraulic pipes 432 and 434 as a static pressure system of the master cylinder 411 and the first controlled pressure supply pipe 444 as a controlled pressure system from the pressure control valve 50. In other words, the ABS 70 is interposed between the first and the second hydraulic pipes 432 and 434 and the first controlled pressure supply pipe 444, and the booster valves 39a and 39b in the ABS 70 function as the changeover valves. In this case, the static pressure system is a hydraulic system capable of manually pressurizing the master cylinder 411 with the depression force on the brake pedal 15 and supplying the controlled pressure generated in this manner to the wheel cylinders 25FR, 25FL, 25RR, and 25RL when the power supply system fails. The controlled pressure system is a hydraulic system capable of supplying the controlled pressure, which is generated by electronically controlling the pressure control valve 50 with the ECU 71 according to the depression force on the brake pedal 15 or the stroke, to the wheel cylinders 25FR, 25FL, 25RR, and 25RL.

In the master cylinder 411, a first relief port 454 communicating with the first relief chamber $R_4$ is formed in the cylinder 412 and connected to the second reservoir chamber 439b of the reservoir tank 439 via a fifth hydraulic pipe 455. A first communication hole 456 capable of connecting the second pressure chamber $R_2$ and the first relief port 454 is formed in the middle piston 414. Between the cylinder 412 and the middle piston 414, a one-way seal 457 is provided on one side of the second relief port 454. A second relief port 458 is formed in the cylinder 412 and connected to the first reservoir chamber 439a of the reservoir tank 439 through a sixth hydraulic pipe 459. In the pressurizing piston 415, a second communication hole 460 that can communicate the second relief port 458 and the first pressure chamber $R_1$ is formed. Between the cylinder 412 and the pressurizing piston 415, one-way seals 461 are provided on opposite sides of the second relief port 458.

Therefore, when the middle piston 414 is in a retreat position, the second pressure chamber $R_2$ and the first relief port 454 communicate with each other through the first communication hole 456, the first relief chamber $R_4$ communicates with the first relief port 454, the first pressure chamber $R_1$ and the second relief port 458 communicate with each other through the second communication hole 460. If the middle piston 414 is pressed by the input piston 413 and moves slightly forward, the second pressure chamber $R_2$ the first relief port 454 are shut off from each other. As a result, the second pressure chamber $R_2$ is sealed and the input piston 413 can come close to the middle piston 414. At this time, if the second master cut valve 436 is in the closed state, forward movement of the middle piston 414 is prevented. If the second master cut valve 436 is in the open state, the forward movement of the middle piston 414 enables supply of the controlled pressure from the second pressure chamber $R_2$ to the second hydraulic pipe 434. If the middle piston 414 moves forward and the pressurizing piston 415 moves forward, the first pressure chamber $R_1$ and the second relief port 458 are shut off from each other. At this time, if the first master cut valve 435 is in the closed state, forward movement of the pressurizing piston 415 is prevented. If the first master cut valve 435 is in the open state, the forward movement of the pressurizing piston 415 enables supply of the controlled pressure from the first pressure chamber $R_1$ to the first hydraulic pipe 432.

The supporting member 416 is mounted with a seal member 462 between the input piston 413 and itself and the supporting member 418 integral with the middle piston 414 is mounted with a seal member 463 between the input piston 413 and itself. In other words, with this structure, the input piston 413 has a seal (seal member 462) diameter on an atmosphere side and a seal (seal member 463) diameter on the middle piston 414 side that are equal to each other. Therefore, when the controlled pressure acts on the back pressure chamber $R_3$ from the third pressure port 446 of the master cylinder 411, the input piston 413 does not receive pressure of the controlled pressure and a reaction force does not change either.

The brake pedal 15 is provided with the stroke sensor 72 for detecting a pedal stroke Sp of the brake pedal 15 and the depression force sensor 73 for detecting the pedal depression force and respective detection results are output to the ECU 71. In the first hydraulic pipe 432, the first pressure sensor 74 for detecting hydraulic pressure is provided on the downstream side of the first master cut valve 435, i.e., on the ABS 70 side. In the second hydraulic pipe 434, the second pressure sensor 75 for detecting hydraulic pressure is provided on the downstream side of the second master cut valve 436, i.e., on the ABS 70 side. The first pressure sensor 74 detects pressure in the first pressure chamber $R_1$, the second pressure sensor 75 detects pressure in the second pressure chamber $R_2$, and respective detection results are output to the ECU 71.

Furthermore, in the high-pressure supply pipe 443 extending from the hydraulic pump 437 to the pressure control valve 50 via the accumulator 442, the third pressure sensor 76 for detecting hydraulic pressure is provided. The third pressure sensor 76 detects the hydraulic pressure accumulated in the accumulator 442 and supplied to the pressure control valve 50 and outputs a detection result to the ECU 71. Wheel speed sensors (not shown) are respectively provided to the front wheels FR and FL and the rear wheels RR and RL and output respective detected wheel speeds to the ECU 71.

Braking force control by the vehicle braking apparatus according to the embodiment will be described specifically. If an occupant depresses the brake pedal 15, the input piston 13 moves forward due to the operating force (depression force). At this time, the ECU 71 controls the pressure control valve 50 based on the target control pressure set according to the pedal depression force, and the pressure control valve 50 regulates pressure of hydraulic pressure accumulated in the accumulator 442 and outputs the controlled pressure equal to the target control pressure to the respective controlled pressure supply pipes 444 and 445.

The hydraulic pressure supplied to the second controlled pressure supply pipe 445 acts on the back pressure chamber $R_3$ via the third pressure port 446 of the master cylinder 411. However, because the input piston 413 has the seal diameter on the atmosphere side and the seal diameter on the middle piston 414 side that are equal to each other, the input piston 413 moves forward irrespective of the controlled pressure and an appropriate reaction force is applied to the brake pedal 15 by the reaction force spring 417.

The controlled pressure supplied to the first controlled pressure supply pipe 444 is applied to the wheel cylinders 25FR and 25FL of the front wheels FR and FL and the wheel cylinders 25RR and 25RL of the rear wheels RR and RL. Therefore, appropriate controlled pressure is applied to the wheel cylinders 25FR and 25FL of front wheels FR and FL, appropriate controlled pressure is applied to the wheel cylinders 25RR and 25RL of rear wheels RR and RL, and it is possible to generate desired braking forces for the front wheels FR and FL and the rear wheels RR and RL according to the operating force on the brake pedal 15 by the occupant.

On the other hand, when failure occurs in a power supply system and the system fails, if the occupant depresses the brake pedal 15, the input piston 413 moves forward due to the operating force. If the input piston 413 moves a longer distance than the initial stroke $S_1$, the input piston 413 presses the middle piston 414 through the rubber members 420 and 421. At this time, because the master cut valves 435 and 436 are open, the input piston 413 and the middle piston 414 integrally move forward to pressurize the second pressure chamber $R_2$. If they move further forward to come to abut against the pressurizing piston 415, the input piston 413, the middle piston 414, and the pressurizing piston 415 integrally move forward to thereby pressurize the first pressure chamber $R_1$. As a result, the hydraulic pressure in the first pressure chamber $R_1$ is discharged into the first hydraulic pipe 432 and the hydraulic pressure in the second pressure chamber $R_2$ is discharged into the second hydraulic pipe 434. The hydraulic pressure in the second hydraulic pipe 434 acts on the pressure control valve 50 via the external pressure supply pipe 449 as the external pressure.

If the external pressure acts on the pressure control valve 50, the hydraulic pressure in the accumulator 442 is regulated and supplied to the respective controlled pressure supply pipes 444 and 445. Then, the hydraulic pressure supplied to the second controlled pressure supply pipe 445 acts on the back pressure chamber $R_3$ via the third pressure port 446 of the master cylinder 411 and this controlled pressure can assist the input piston 413 through the middle piston 414.

As a result, the controlled pressure supplied to the first controlled pressure supply pipe 444 is applied to the wheel cylinders 25RR and 25RL of the rear wheels RR and RL. Because of the input piston 413 that moves forward easily while assisted by the controlled pressure, the controlled pressure equal to the controlled pressure in the second controlled pressure supply pipe 445 is discharged from the first pressure chamber $R_1$ into the first hydraulic pipe 432 and the same controlled pressure is discharged from the second pressure chamber $R_2$ into the second hydraulic pipe 434. As a result, the controlled pressure supplied to the respective hydraulic pipes 432 and 434 is applied to the wheel cylinders 25FR and 25FL of the front wheels FR and FL. Therefore, the appropriate controlled pressure is applied to the wheel cylinders 25FR and 25FL of the front wheels FR and FL and the appropriate controlled pressure is applied to the wheel cylinders 25RR and 25RL of the rear wheels RR and RL, and it is possible to generate desired braking forces for the front wheels FR and FL and the rear wheels RR and RL according to the operating force by the occupant on the brake pedal 15.

Even if one of the hydraulic pressure supply paths to the wheel cylinders 25FR and 25FL of the front wheels FR and FL fails, the controlled pressure can be supplied to the other hydraulic pressure supply path to generate the braking force.

As described above, in the vehicle braking apparatus according to the fourth embodiment, the first and the second master cut valves 435 and 436 capable of opening and closing the first and the second hydraulic pipes 432 and 434 for supplying the hydraulic pressure from the master cylinder 411 to the wheel cylinders 25FR and 25FL are provided. The external pressure supply pipe 449 for supplying the pilot pressure to the pressure control valve 50 is connected to the second hydraulic pipe 434 on the side of the second master cut valve 436 closer to the wheel cylinder 25FL.

In this way, when the power supply system is normal, the second master cut valve 436 is in the closed state and therefore the external pressure supply pipe 449 and the second pressure chamber $R_2$ in the master cylinder 411 are shut off from each other. Therefore, the hydraulic pressure of the first pressure chamber $R_2$ does not act on the pressure control valve 50 and regenerative cooperative control is possible. When the power supply system fails, the second master cut valve 436 is in the open state and therefore the external pressure supply pipe 449 and the second pressure chamber $R_2$ in the master cylinder 411 communicate with each other. As a result, the hydraulic pressure of the second pressure chamber $R_2$ in the master cylinder 411 can be applied to the pressure control valve 50 as the external pressure. Therefore, the regenerative cooperative control can be carried out without adding a new electromagnetic valve and it is possible to simplify the structure.

Moreover, in the vehicle braking apparatus according to the fourth embodiment, the booster valves 39a and 39b in the ABS 70 are applied as changeover valves capable of changing the system at the connection between the first and the second hydraulic pipes 432 and 434 as the static pressure system of the master cylinder 411 and the first controlled pressure supply pipe 444 as the controlled pressure system from the pressure control valve 50. Therefore, the static pressure system and the controlled pressure system can be shut off from each other and it is possible to appropriately switch between manual pressurization by the static pressure system and electronic pressurization by the controlled pressure system without increasing the electromagnetic valve or the like, which simplifies the apparatus and reduces cost.

INDUSTRIAL APPLICABILITY

As described above, in the vehicle braking apparatus according to the present invention, the external pressure supply passage for supplying the pilot pressure to the pressure control valve is connected to the hydraulic pipe on the side of the master cut valve closer to the wheel cylinders. Therefore, even when the power supply system fails, it is possible to supply the hydraulic pressure to the wheel cylinders to thereby secure the appropriate braking forces, which increases reliability and safety and simplifies the structure. For this reason, the present invention is suitable for any kind of braking apparatuses.

EXPLANATIONS OF LETTERS OR NUMERALS 11, 211, 311, 411 master cylinder
12, 412 cylinder
13, 413 input piston (piston)
14, 415 pressurizing piston (piston)
15 brake pedal (operation member)
21, 23, 416, 418 supporting member
22, 417 reaction force spring
24, 420, 421 rubber member
25FR, 25FL, 25RR, 25RL wheel cylinder
27, 432 first hydraulic pipe (hydraulic passage)
30, 434 second hydraulic pipe
32, 435, 436 master cut valve
33 communication hydraulic pipe (communication hydraulic passage)
34 communication valve
39a, 39b, 40a, 40b booster valve (changeover valve)
41a, 41b, 42a, 42b pressure reducing valve
43, 437 hydraulic pump
46, 439 reservoir tank
48, 442 accumulator
49, 443 high-pressure supply pipe
50 pressure control valve
51, 444, 445 controlled pressure supply pipe (controlled pressure passage)
54, 449 external pressure supply pipe (pilot passage)
70 ABS
71 electronic control unit, ECU
72 stroke sensor
73 depression force sensor
74 first pressure sensor
75 second pressure sensor
76 third pressure sensor
117 drive piston (drive valve)
121 external piston (drive valve)
122 control valve
414 middle piston (piston)
$R_1$ first pressure chamber
$R_2$ second pressure chamber
$R_3$ back pressure chamber (third pressure chamber)
$R_4$, $R_5$ relief chamber
$S_1$ initial clearance, initial stroke (stroke absorbing mechanism)

The invention claimed is:

1. A vehicle braking apparatus comprising:
an operation member to which an occupant can operate for braking;
a master cylinder capable of outputting a predetermined hydraulic pressure by moving a piston according to an operation stroke of the operation member to pressurize a hydraulic fluid;
wheel cylinders that generate braking forces for wheels by receiving the hydraulic pressure;
a hydraulic passage that connects the master cylinder and the wheel cylinders;
a master cut valve capable of opening and closing the hydraulic passage;
a pressure control valve capable of regulating and outputting a hydraulic pressure by moving a drive valve due to an electromagnetic force based on a target control pressure according to the operation stroke of the operation member, and capable of regulating and outputting a hydraulic pressure by moving the drive valve due to a hydraulic pressure from the master cylinder as a pilot pressure;

a controlled pressure passage capable of supplying the hydraulic pressure from the pressure control valve to the wheel cylinders;

a control unit capable of controlling the pressure control valve and the master cut valve; and a pilot passage that supplies the pilot pressure to the pressure control valve and that is connected to the hydraulic passage on a side of the master cut valve closer to the wheel cylinders, wherein when a power supply system is normal, the master cut valve is in a closed state and the hydraulic pressure from the master cylinder does not act on the pressure control valve via the pilot pressure, and when the power supply system fails, the master cut valve is in an open state and the hydraulic pressure from the master cylinder acts on the pressure control valve via the pilot passage, thereby applying controlled pressure to the wheel cylinders.

2. The vehicle braking apparatus according to claim 1, wherein the master cylinder is partitioned into a first pressure chamber, a second pressure chamber, and a third pressure chamber by movably supporting an input piston and a pressurizing piston as the piston in a cylinder, the hydraulic passage is connected to the first pressure chamber, the controlled pressure passage is connected to the third pressure chamber, and a stroke absorbing mechanism is provided between the input piston and the pressurizing piston.

3. The vehicle braking apparatus according to claim 2, wherein the hydraulic passage is connected to the wheel cylinder of a front wheel, the controlled pressure passage is connected to the wheel cylinder of a rear wheel, and a communication valve is provided in a communication hydraulic passage that communicates the hydraulic passage and the controlled pressure passage.

4. The vehicle braking apparatus according to claim 1, wherein the controlled pressure passage is connected to the hydraulic passage on the side of the master cut valve closer to the wheel cylinders, and a changeover valve is provided to the connection.

5. The vehicle braking apparatus according to claim 4, wherein the master cylinder is partitioned into a first pressure chamber, a second pressure chamber, and a third pressure chamber by movably supporting an input piston and a pressurizing piston as the piston in a cylinder, the first hydraulic passage as the hydraulic passage is connected to the first pressure chamber, the second hydraulic passage as the hydraulic passage is connected to the second pressure chamber, the first hydraulic passage and the second hydraulic passage are connected to the wheel cylinder for a front wheel, and the controlled pressure passage is connected to the wheel cylinders for front and rear wheels.

6. The vehicle braking apparatus according to claim 5, wherein an antilock brake system having a booster valve and a pressure reducing valve is provided between the controlled pressure passage and the wheel cylinders of the front and rear wheels and the booster valve or the pressure reducing valve functions as the changeover valve.

* * * * *

UNITED STATES PATENT AND TRADEMARK OFFICE
CERTIFICATE OF CORRECTION

PATENT NO. : 8,500,217 B2
APPLICATION NO. : 12/810413
DATED : August 6, 2013
INVENTOR(S) : Hiroshi Isono Page 1 of 1

It is certified that error appears in the above-identified patent and that said Letters Patent is hereby corrected as shown below:

On the title page, Item (54) and in the Specification, column 1, line 1, the title is incorrect. Item (54) and column 1, line 1 should read:

--(54) VEHICLE BRAKING APPARATUS--

Signed and Sealed this
First Day of October, 2013

Teresa Stanek Rea
*Deputy Director of the United States Patent and Trademark Office*